(12) United States Patent
Deutsch

(10) Patent No.: US 8,038,964 B2
(45) Date of Patent: Oct. 18, 2011

(54) DEVICE FOR STUDYING INDIVIDUAL CELLS

(75) Inventor: Mordechai Deutsch, Moshav Olesh-Doar-Na Lev HaSharon (IL)

(73) Assignee: Seng Enterprises Ltd., Larnaca (CY)

( * ) Notice: Subject to any disclaimer, the term of this patent is extended or adjusted under 35 U.S.C. 154(b) by 596 days.

(21) Appl. No.: 11/883,028

(22) PCT Filed: Jul. 26, 2005

(86) PCT No.: PCT/IL2005/000801
§ 371 (c)(1),
(2), (4) Date: Oct. 24, 2008

(87) PCT Pub. No.: WO2006/080000
PCT Pub. Date: Aug. 3, 2006

(65) Prior Publication Data
US 2009/0105095 A1    Apr. 23, 2009

Related U.S. Application Data

(60) Provisional application No. 60/646,512, filed on Jan. 25, 2005.

(51) Int. Cl.
*G01N 21/75*    (2006.01)
*C12M 1/34*    (2006.01)

(52) U.S. Cl. .................................... 422/401; 435/288.3

(58) Field of Classification Search .................. 422/401; 435/288.3
See application file for complete search history.

(56) References Cited

U.S. PATENT DOCUMENTS

| | | | |
|---|---|---|---|
| 3,558,387 A | 1/1971 | Bassemir et al. | |
| 4,072,578 A | 2/1978 | Cady et al. | |
| 4,207,554 A | 6/1980 | Resnick et al. | |
| 4,308,351 A | 12/1981 | Leighton et al. | |
| 4,684,538 A | 8/1987 | Klemarczyk | |
| 4,716,101 A | 12/1987 | Thompson | |
| 4,729,949 A | 3/1988 | Weinreb et al. | |
| 4,894,343 A | 1/1990 | Tanaka et al. | |
| 5,059,266 A | 10/1991 | Yamane et al. | |
| 5,204,055 A | 4/1993 | Sachs et al. | |
| 5,272,081 A | 12/1993 | Weinreb | |
| 5,324,591 A | 6/1994 | Georger et al. | |

(Continued)

FOREIGN PATENT DOCUMENTS

EP    0059297    9/1982

(Continued)

OTHER PUBLICATIONS

Communication Pursuant to Article 94(3) EPC Dated Aug. 6, 2010 From the European Patent Office Re.: Application No. 04714873.9.

(Continued)

*Primary Examiner* — Lore Jarrett

(57) ABSTRACT

A device for studying individual cells including a picowell array (such as an array of microwells, dimples, depressions, tubes or enclosures) and a fluid reservoir in fluid communication with the picowells through channels is disclosed. Preferably, the device has a moveable lid that in one rest location allows loading of cells in the picowell array. Preferably the channels of the device are capillary channels.

Also disclosed is a device for the automated study of cells including a picowell-bearing device having a picowell array with a moveable lid, a lid-moving component, at least one solution dispensing component and a control system functionally associated with the lid-moving component as well as with the solution dispensing component.

26 Claims, 22 Drawing Sheets
(2 of 22 Drawing Sheet(s) Filed in Color)

U.S. PATENT DOCUMENTS

| | | |
|---|---|---|
| 5,395,588 A | 3/1995 | North, Jr. et al. |
| 5,428,451 A | 6/1995 | Lea et al. |
| 5,506,141 A | 4/1996 | Weinreb et al. |
| 5,525,800 A | 6/1996 | Sanghera et al. |
| 5,612,184 A | 3/1997 | Rosson |
| 5,627,045 A | 5/1997 | Bochner et al. |
| 5,650,323 A | 7/1997 | Root et al. |
| 5,707,869 A | 1/1998 | Wolf et al. |
| 5,854,684 A | 12/1998 | Stabile et al. |
| 5,905,031 A | 5/1999 | Kuylen et al. |
| 5,910,287 A | 6/1999 | Cassin et al. |
| 6,025,129 A | 2/2000 | Nova et al. |
| 6,027,695 A | 2/2000 | Oldenburg et al. |
| 6,046,426 A | 4/2000 | Jeantette et al. |
| 6,066,285 A | 5/2000 | Kumar |
| 6,103,479 A | 8/2000 | Taylor |
| 6,117,612 A | 9/2000 | Halloran et al. |
| 6,206,672 B1 | 3/2001 | Grenda |
| 6,228,437 B1 | 5/2001 | Schmidt |
| 6,238,614 B1 | 5/2001 | Yang et al. |
| 6,329,195 B1 | 12/2001 | Pfaller |
| 6,333,192 B1 | 12/2001 | Petitte et al. |
| 6,338,964 B1 | 1/2002 | Matanguihan et al. |
| 6,342,384 B1 | 1/2002 | Chung et al. |
| 6,344,354 B1 | 2/2002 | Webster et al. |
| 6,345,115 B1 | 2/2002 | Ramm et al. |
| 6,372,494 B1 | 4/2002 | Naughton et al. |
| 6,376,148 B1 | 4/2002 | Liu et al. |
| 6,377,721 B1 | 4/2002 | Walt et al. |
| 6,378,527 B1 | 4/2002 | Hungerford et al. |
| 6,383,810 B2 | 5/2002 | Fike et al. |
| 6,403,369 B1 | 6/2002 | Wood |
| 6,410,309 B1 | 6/2002 | Barbera-Guillem et al. |
| 6,413,680 B1 | 7/2002 | Watanabe et al. |
| 6,413,744 B1 | 7/2002 | Morris et al. |
| 6,413,746 B1 | 7/2002 | Field |
| 6,455,310 B1 | 9/2002 | Barbera-Guillem et al. |
| 6,465,000 B1 | 10/2002 | Kim |
| 6,465,205 B2 | 10/2002 | Hicks, Jr. |
| 6,468,788 B1 | 10/2002 | Marotzki |
| 6,479,252 B1 | 11/2002 | Barbera-Guillem et al. |
| 6,485,690 B1 | 11/2002 | Pfost et al. |
| 6,489,144 B1 | 12/2002 | Lau |
| 6,492,148 B1 | 12/2002 | van Loon et al. |
| 6,492,163 B1 | 12/2002 | Yoo et al. |
| 6,495,340 B2 | 12/2002 | Huberman et al. |
| 6,506,598 B1 | 1/2003 | Andersen et al. |
| 6,511,430 B1 | 1/2003 | Sherar et al. |
| 6,528,286 B1 | 3/2003 | Ryll |
| 6,544,788 B2 | 4/2003 | Singh |
| 6,555,365 B2 | 4/2003 | Barbera-Guillem et al. |
| 6,569,422 B1 | 5/2003 | van Loon et al. |
| 6,588,586 B2 | 7/2003 | Abasolo et al. |
| 6,589,765 B1 | 7/2003 | Choi et al. |
| 6,593,101 B2 | 7/2003 | Richards-Kortum et al. |
| 6,593,140 B1 | 7/2003 | Field |
| 6,610,516 B1 | 8/2003 | Andersen et al. |
| 6,627,426 B2 | 9/2003 | Biddle et al. |
| 6,632,619 B1 | 10/2003 | Harrison et al. |
| 6,635,448 B2 | 10/2003 | Bucciarelli et al. |
| 6,642,050 B1 | 11/2003 | Goto et al. |
| 6,645,757 B1 | 11/2003 | Okandan et al. |
| 6,649,408 B2 | 11/2003 | Bailey et al. |
| 6,653,124 B1 | 11/2003 | Freeman |
| 6,660,501 B2 | 12/2003 | Field |
| 6,667,034 B2 | 12/2003 | Palsson et al. |
| 6,670,180 B2 | 12/2003 | Block |
| 6,670,184 B2 | 12/2003 | Chiarello et al. |
| 6,673,591 B2 | 1/2004 | Lau |
| 6,686,190 B2 | 2/2004 | Lau |
| 6,689,594 B1 | 2/2004 | Hanni et al. |
| 6,692,961 B1 | 2/2004 | Judd et al. |
| 7,118,910 B2 | 10/2006 | Unger et al. |
| 7,139,415 B2 | 11/2006 | Finkbeiner |
| 7,169,578 B2 | 1/2007 | Wang et al. |
| 7,323,305 B2 * | 1/2008 | Leamon et al. .................. 435/6 |
| 7,354,733 B2 | 4/2008 | Bukshpan et al. |
| 7,403,647 B2 | 7/2008 | Deutsch et al. |
| 7,405,071 B2 | 7/2008 | Deutsch |
| 7,888,110 B2 | 2/2011 | Deutsch et al. |
| 2002/0052003 A1 | 5/2002 | Alberte et al. |
| 2002/0064885 A1 | 5/2002 | Bedingham et al. |
| 2002/0106715 A1 | 8/2002 | Huberman et al. |
| 2002/0150909 A1 | 10/2002 | Stuelpnagel et al. |
| 2002/0173033 A1 | 11/2002 | Hammerick et al. |
| 2002/0182627 A1 | 12/2002 | Wang et al. |
| 2002/0187074 A1 | 12/2002 | O'Connor et al. |
| 2002/0189374 A1 | 12/2002 | DeSilets et al. |
| 2003/0017079 A1 | 1/2003 | Hahn et al. |
| 2003/0030184 A1 | 2/2003 | Kim et al. |
| 2003/0032204 A1 | 2/2003 | Walt et al. |
| 2003/0036188 A1 | 2/2003 | Kim et al. |
| 2003/0059764 A1 | 3/2003 | Ravkin et al. |
| 2003/0082632 A1 | 5/2003 | Shumate |
| 2003/0082818 A1 | 5/2003 | Bahnson et al. |
| 2003/0104494 A1 | 6/2003 | Ravkin et al. |
| 2003/0113833 A1 | 6/2003 | Oka et al. |
| 2003/0124716 A1 | 7/2003 | Hess et al. |
| 2003/0189850 A1 | 10/2003 | Sasaki et al. |
| 2003/0211458 A1 | 11/2003 | Sunray et al. |
| 2004/0053354 A1 | 3/2004 | Ikawa et al. |
| 2004/0091397 A1 | 5/2004 | Picard |
| 2004/0118757 A1 | 6/2004 | Terstappen et al. |
| 2004/0216835 A1 | 11/2004 | Tanner et al. |
| 2004/0235143 A1 | 11/2004 | Sasaki et al. |
| 2004/0241783 A1 | 12/2004 | Papkovsky et al. |
| 2005/0014201 A1 | 1/2005 | Deutsch |
| 2005/0026299 A1 | 2/2005 | Bhattacharjee et al. |
| 2005/0064524 A1 | 3/2005 | Deutsch et al. |
| 2005/0170498 A1 | 8/2005 | Dolley et al. |
| 2005/0277125 A1 | 12/2005 | Benn et al. |
| 2006/0041384 A1 | 2/2006 | Kermani et al. |
| 2006/0057557 A1 | 3/2006 | Deutsch et al. |
| 2006/0154233 A1 | 7/2006 | Deutsch |
| 2006/0240548 A1 | 10/2006 | Deutsch et al. |
| 2007/0105089 A1 | 5/2007 | Deutsch |
| 2007/0141555 A1 | 6/2007 | Deutsch |
| 2007/0154357 A1 | 7/2007 | Szlosek |
| 2007/0178607 A1 | 8/2007 | Prober et al. |
| 2007/0292837 A1 | 12/2007 | Deutsch et al. |
| 2008/0003142 A1 * | 1/2008 | Link et al. .................. 422/82.08 |
| 2008/0009051 A1 | 1/2008 | Deutsch et al. |
| 2008/0063251 A1 | 3/2008 | Deutsch |
| 2008/0063572 A1 | 3/2008 | Deutsch et al. |
| 2008/0241874 A1 | 10/2008 | Deutsch |
| 2009/0105095 A1 | 4/2009 | Deutsch |
| 2009/0111141 A1 | 4/2009 | Deutsch |
| 2011/0014688 A1 | 1/2011 | Deutsch et al. |

FOREIGN PATENT DOCUMENTS

| | | |
|---|---|---|
| EP | 0094193 | 11/1983 |
| EP | 0602416 | 6/1994 |
| EP | 1262764 | 12/2002 |
| EP | 1566635 | 8/2005 |
| EP | 1691196 | 8/2006 |
| JP | 62-171687 | 7/1987 |
| JP | 06-221988 | 8/1994 |
| JP | 06-237753 | 8/1994 |
| JP | 10-276763 | 10/1998 |
| JP | 11-507724 | 7/1999 |
| JP | 2005-102628 | 4/2005 |
| WO | WO 96/31548 | 10/1996 |
| WO | WO 96/41153 | 12/1996 |
| WO | WO 98/15356 | 4/1998 |
| WO | WO 98/35223 | 8/1998 |
| WO | WO 99/45357 | 9/1999 |
| WO | WO 99/47922 | 9/1999 |
| WO | WO 99/66329 | 12/1999 |
| WO | WO 01/02539 | 1/2001 |
| WO | WO 01/35071 | 5/2001 |
| WO | WO 01/49824 | 7/2001 |
| WO | WO 01/88176 | 11/2001 |
| WO | WO 01/88185 | 11/2001 |
| WO | WO 02/08748 | 1/2002 |
| WO | WO 02/26114 | 4/2002 |
| WO | WO 02/48676 | 6/2002 |
| WO | WO 02/055653 | 7/2002 |

| | | |
|---|---|---|
| WO | WO 02/063034 | 8/2002 |
| WO | WO 02/064728 | 8/2002 |
| WO | WO 02/081662 | 10/2002 |
| WO | WO 02/097398 | 12/2002 |
| WO | WO 03/035824 | 1/2003 |
| WO | WO 03/011451 | 2/2003 |
| WO | WO 03/046508 | 6/2003 |
| WO | WO 03/052375 | 6/2003 |
| WO | WO 03/056330 | 7/2003 |
| WO | WO 03/056345 | 7/2003 |
| WO | WO 2004/077009 | 9/2004 |
| WO | WO 2004/113492 | 12/2004 |
| WO | WO 2005/007796 | 1/2005 |
| WO | WO 2005/069001 | 7/2005 |
| WO | WO 2005/103691 | 11/2005 |
| WO | WO 2006/003664 | 1/2006 |
| WO | WO 2006/021959 | 2/2006 |
| WO | WO 2006/043267 | 4/2006 |
| WO | WO 2006/080000 | 8/2006 |
| WO | WO 2007/052245 | 5/2007 |
| WO | WO 2007/074449 | 7/2007 |
| WO | WO 2009/063462 | 5/2009 |
| WO | WO 2009/081409 | 7/2009 |

OTHER PUBLICATIONS

Office Action Dated Jul. 1, 2010 From the Israeli Patent Office Re.: Application No. 172724 and Its Translation Into English.
Official Action Dated Aug. 17, 2010 From the US Patent and Trademark Office Re.: U.S. Appl. No. 10/561,839.
Office Action Dated Oct. 5, 2010 From the Israel Patent Office Re. Application No. 184818 and Its Translation Into English.
Response Dated Oct. 4, 2010 to Official Action of Sep. 2, 2010 From the US Patent and Trademark Office Re. U.S. Appl. No. 10/565,240.
Supplementary European Search Report Dated Feb. 20, 2006 From the European Patent Office Re.: Application No. 04714873.9.
Ducrée "Polymer Prototyping von mikrofluidischen Strukturen. Projekt", Insitut für Mikrosystemtechnik, Albert-Ludwigs-Universität Freiburg i. Br., IMTEK, 4 P., 2004. Retrieved From the Internet: http://images.google.com/imgres?imgurl=http://www.imtek.de/anwendungen/content/upload/vorlesung/133/133-03-14_ prototyping_hydrophobic.jpg&imgrefurl=http://www.imtek.de/content/projekte.php%3Fls%3D3%26nr%3D133&h=299&w=429&.
Suehiro et al. "The Dielectrophoretic Movement and Positioning of a Biological Cell Using a Three-Dimensional Grid Electrode System", J. Phys. D. Appl. Phys, vol. 31 P.3298-3305, 1998.
Tixier et al. Catching and Attaching Cells Using an Array of Microholes, Abstract of the 2nd Conference of the Society for Chemistry and Micro Systems, P.60, 2000.
International Search Report Dated Sep. 10, 2009 From the International Searching Authority Re.: Application No. PCT/IL2008/001678.
International Search Report Dated Nov. 15, 2005 From the International Searching Authority Re.: PCT/IL2005/000719.
Official Action Dated Mar. 23, 2005 From the US Patent and Trademark Office Re.: U.S. Appl. No. 10/276,080.
Response Dated Dec. 14, 2009 to Office Action of Jul. 14, 2009 From the Israel Patent Office Re.: Application No. 172724.
Supplementary European Search Report Dated Oct. 22, 2009 From the European Patent Office Re.: Application No. 04744911.1.
Supplementary European Search Report Dated Oct. 22, 2009 From the European Patent Office Re.: Application No. 04745001.0.
Written Opinion Dated Sep. 10, 2009 From the International Searching Authority Re.: Application No. PCT/IL2008/001678.
Official Action Dated Feb. 5, 2007 From the US Patent and Trademark Office Re.: U.S. Appl. No. 10/916,380.
Official Action Dated Feb. 19, 2008 From the US Patent and Trademark Office Re.: U.S. Appl. No. 10/492,531.
Official Action Dated Sep. 20, 2007 From the US Patent and Trademark Office Re.: U.S. Appl. No. 10/492,531.
Official Action Dated Jan. 25, 2007 From the US Patent and Trademark Office Re.: U.S. Appl. No. 10/492,531.
Communication Pursuant to Article 94(3) EPC Dated Feb. 29, 2008 From the European Patent Office Re.: 05763452.9.
Communication Relating to the Results of the Partial International Search Dated May 20, 2009 From the International Searching Authority Re.: Application No. PCT/IL2008/001678.
International Preliminary Report on Patentability Dated Feb. 2, 2006 From the International Bureau of WIPO Re.: Application No. PCT/IL2004/000661.
International Preliminary Report on Patentability Dated May 3, 2007 From the International Bureau of WIPO Re.: Application No. PCT/IL2005/001078.
International Preliminary Report on Patentability Dated Mar. 8, 2007 From the International Bureau of WIPO Re.: Application No. PCT/IL2005/000914.
International Preliminary Report on Patentability Dated Aug. 9, 2007 From the International Bureau of WIPO Re.: Application No. PCT/IL2005/000801.
International Preliminary Report on Patentability Dated Jul. 10, 2008 From the International Bureau of WIPO Re.: Application No. PCT/IL2006/001487.
International Preliminary Report on Patentability Dated Jan. 18, 2007 From the International Bureau of WIPO Re.: Application No. PCT/IL2005/000719.
International Preliminary Report on Patentability Dated Nov. 28, 2007 From the International Bureau of WIPO Re.: Application No. PCT/IL2006/000483.
International Search Report Dated May 13, 2009 From the International Searching Authority Re.: Application No. PCT/IL08/01492.
Invitation to Pay Additional Fees Dated Mar. 3, 2009 From the International Searching Authority Re.: Application No. PCT/IL 08/01492.
Notice of Allowance Dated Mar. 4, 2008 From the US Patent and Trademark Office Re.: U.S. Appl. No. 10/546,784.
Notice of Allowance Dated Jan. 7, 2008 From the US Patent and Trademark Office Re.: U.S. Appl. No. 10/938,951.
Notice of Allowance Dated Jan. 7, 2008 From the US Patent and Trademark Office Re.: U.S. Appl. No. 10/938,951.
Office Action Dated Mar. 8, 2006 From the Israeli Patent Office Re.: Application No. 138314.
Office Action Dated Apr. 12, 2007 From the Israeli Patent Office Re.: Application No. 138314.
Office Action Dated May 15, 2008 From the Israeli Patent Office Re.: U.S. Appl. No. 10/916,380.
Office Action Dated Jul. 19, 2006 From the Israeli Patent Office Re.: Application No. 138314.
Office Action Dated Mar. 22, 2009 From the Israeli Patent Office Re.: Application No. 170492 and Its Translation Into English.
Office Action Dated Sep. 29, 2003 From the Israeli Patent Office Re.: Application No. 136232.
Official Action Dated Feb. 5, 2007 From the US Patent and Trademark Office Re.: U.S. Appl. No. 10/916,380.
Official Action Dated Dec. 14, 2007 From the US Patent and Trademark Office Re.: U.S. Appl. No. 10/916,380.
Official Action Dated Nov. 14, 2008 From the US Patent and Trademark Office Re.: U.S. Appl. No. 10/492,531.
Official Action Dated Oct. 16, 2006 From the US Patent and Trademark Office Re.: U.S. Appl. No. 10/492,531.
Official Action Dated Dec. 18, 2006 From the US Patent and Trademark Office Re.: U.S. Appl. No. 10/276,080.
Official Action Dated Feb. 19, 2008 From the US Patent and Trademark Office Re.: U.S. Appl. No. 10/492,531.
Official Action Dated Sep. 20, 2007 From the US Patent and Trademark Office Re.: U.S. Appl. No. 10/492,531.
Official Action Dated Oct. 22, 2007 From the US Patent and Trademark Office Re.: U.S. Appl. No. 11/492,531.
Official Action Dated Feb. 23, 2010 From the US Patent and Trademark Office Re.: U.S. Appl. No. 12/084,462.
Official Action Dated Aug. 25, 2006 From the US Patent and Trademark Office Re.: U.S. Appl. No. 10/276,080.
Official Action Dated Jan. 25, 2007 From the US Patent and Trademark Office Re.: U.S. Appl. No. 10/492,531.
Official Action Dated Aug. 28, 2007 From the US Patent and Trademark Office Re.: U.S. Appl. No. 10/916,380.
Official Action Dated Jan. 28, 2010 From the US Patent and Trademark Office Re.: U.S. Appl. No. 10/492,531.

Response Dated Dec. 29, 2009 to Office Action of Sep. 2, 2009 From the Israel Patent Office Re.: Application No. 200559.
Translation of Notice of Reason for Rejection Dated Nov. 27, 2007 From Japanes Patent Office Re.: Application No. 2003-538325.
Translation of Notice of Reason for Rejection Dated Mar. 30, 2010 From the Japanese Patent Office Re.: Application No. 2006-502647.
Written Opinion Dated May 13, 2009 From the International Searching Authority Re.: Application No. PCT/IL08/01492.
Duerée "Polymer Prototyping von mikrofluidischen Strukturen. Projekt", Insitut für Mikrosystemtechnik, Albert-Ludwigs-Universität Freiburg i. Br., IMTEK, 4 P., 2004. Retrieved From the Internet: http://images.google.com/imgres?imgurl=http://www.imtek.de/anwendungen/content/upload/vorlesung/133/133-03-14_prototyping_hydrophobic.jpg&imgrefurl=http://www.imtek.de/content/projekte.php%3FIs%3D3%26nr%3D133&h=299&w=429&.
Tixier et al. Catching and Attaching Cells Using An Array of Microholes, 2nd Conference of the Society for Chemistry and Micro Systems, P.60, 2000. Abstract.
International Search Report Dated Mar. 2, 2005 From the International Searching Authority Re.: Application No. PCT/IL04/00661.
International Search Report Dated Feb. 7, 2006 From the International Searching Authority Re.: Application No. PCT/IL2005/001078.
International Search Report Dated Nov. 7, 2005 From the International Searching Authority Re.: PCT/IL2005/000801.
International Search Report Dated Nov. 9, 2004 From the International Searching Authority Re.: Application No. PCT/IL04/00571.
International Search Report Dated Sep. 11, 2006 From the International Seaching Authority Re.: Application No. PCT/IL2006/000483.
International Search Report Dated Feb. 16, 2005 From the International Searching Authority Re.: PCT/IL04/00194.
International Search Report Dated Jan. 17, 2003 From the International Searching Authority Re.: Application No. PCT/IL01/00992.
International Search Report Dated Feb. 21, 2006 From the International Searching Authority Re.: Application No. PCT/IL2005/000914.
International Search Report Dated Sep. 21, 2007 From the International Searching Authority Re.: PCT/IL2006/001487.
International Search Report Dated Dec. 27, 2001 From the International Searching Authority Re.: Application No. PCT/IL01/00443.
Official Action Dated Mar. 5, 2010 From the US Patent and Trademark Office Re.: U.S. Appl. No. 10/561,839.
Supplementary European Search Report Dated Oct. 26, 2004 From the European Patent Office Re.: Application No. EP 01934272.
Written Opinion Dated Nov. 15, 2005 From the International Searching Authority Re.: Application No. PCT/IL2005/000719.
Deutsch et al. "Microplate Cell-Retaining Methodology for High-Content Analysis of Individual Non-Adherent Unanchored Cells in a Population", Biomedical Microdevices, 8: 361-374, 2006.
Seahorse Bioscience "Designed for Scientists by Sciencetists. How the XF24 Extracellular Flux Analyzer Works", Product Description, Seahorse Bioscience, 4 P., 2008.
Seahorse Bioscience "XF24 Extracellular Flux Analyzer", Product Description, Seahorse Bioscience, 3 P., 2008.
Craighead et al. Textured Surfaces: Optical Storage and Other Applications,Journal of Vacuum Science and Technology 20 (3): 316, 1982. Abstract.
Kiguchi et al. "Induction of Urokinase-Type Plasminogen Activator by the Anthracycline Antibiotic in Human RC-K8 Lymphoma and H69 Lung-Carcinoma Cells", International Journal of Cancer, 93: 792-797, 2001.
Schroeder et al. "Coordination of Cell Growth in Cocultures by a Genetic Proliferation Control System", Biotechnology and Bioengineering, 78(3): 346-352, 2002.
Suehiro et al. "The Dielectrophoretic Movement and Positioning of a Biological Cell Using a Three-Dimensional Grid Electrode System", J. Phys. D. Appl. Phys, vol. 31 P.3298-3305, 1998.
International Preliminary Report on Patentability Dated May 27, 2010 From the International Bureau of WIPO Re.: Application No. PCT/IL2008/001492.
International Preliminary Report on Patentability Dated May 27, 2010 From the International Preliminary Examining Authority Re.: Application No. PCT/IL2008/001678.
Response Dated May 25, 2010 to Official Action of Jan. 28, 2010 From the US Patent and Trademark Office Re.: U.S. Appl. No. 10/492,531.
Response Dated Jun. 15, 2010 to Notice of Reason for Rejection of Mar. 30, 2010 From the Japanese Patent Office Re. Application No. 2006-502647.
OA Missing Parts Nov. 14, 2006.
Official Action Dated Feb. 5, 2007 From the US Patent and Trademark Office Re.: U.S. Appl. No. 10/916,380.
Official Action Dated Dec. 18, 2006 From the US Patent and Trademark Office Re.: U.S. Appl. No. 10/276,080.
Official Action Dated Feb. 19, 2008 From the US Patent and Trademark Office Re.: U.S. Appl. No. 10/492,531.
Official Action Dated Sep. 20, 2007 From the US Patent and Trademark Office Re.: U.S. Appl. No. 10/492,531.
Official Action Dated Mar. 23, 2005 From the US Patent and Trademark Office Re.: U.S. Appl. No. 10/276,080.
Official Action Dated Jan. 25, 2007 From the US Patent and Trademark Office Re.: U.S. Appl. No. 10/492,531.
Communication Pursuant to Article 94(3) EPC Dated Feb. 13, 2009 From the European Patent Office Re.: Application No. 05763452.9.
Communication Pursuant to Article 94(3) EPC Dated Feb. 29, 2008 From the European Patent Office Re.: 05763452.9.
Communication Relating to the Results of the Partial International Search Dated May 20, 2009 From the International Searching Authority Re.: Application No. PCT/IL2008/001678.
International Preliminary Report on Patentability Dated Feb. 2, 2006 From the International Bureau of WIPO Re.: Application No. PCT/IL2004/000661.
International Preliminary Report on Patentability Dated May 3, 2007 From the International Bureau of WIPO Re.: Application No. PCT/IL2005/001078.
International Preliminary Report on Patentability Dated Mar. 8, 2007 From the International Bureau of WIPO Re.: Application No. PCT/IL2005/000914.
International Preliminary Report on Patentability Dated Jul. 10, 2008 From the International Bureau of WIPO Re.: Application No. PCT/IL2006/001487.
International Preliminary Report on Patentability Dated Jan. 18, 2007 From the International Bureau of WIPO Re.: Application No. PCT/IL2005/000719.
International Preliminary Report on Patentability Dated Nov. 28, 2007 From the International Bureau of WIPO Re.: Application No. PCT/IL2006/000483.
International Preliminary Report on Patentability Dated Aug. 9, 2007 From the International Bureau of WIPO Re.: Application No. PCT/IL2005/000801.
International Search Report Dated May 13, 2009 From the International Searching Authority Re.: Application No. PCT/IL08/01492.
Invitation to Pay Additional Fees Dated Mar. 3, 2009 From the International Searching Authority Re.: Application No. PCT/IL 08/01492.
Notice of Allowance Dated Mar. 4, 2008 From the US Patent and Trademark Office Re.: U.S. Appl. No. 10/546,784.
Notice of Allowance Dated Jan. 7, 2008 From the US Patent and Trademark Office Re.: U.S. Appl. No. 10/938,951.
Office Action Dated May 15, 2008 From the Israeli Patent Office Re.: U.S. Appl. No. 10/916,380.
Office Action Dated Jan. 4, 2007.
Office Action Dated Mar. 8, 2006 From the Israeli Patent Office Re.: Application No. 138314.
Office Action Dated Apr. 12, 2007 From the Israeli Patent Office Re.: Application No. 138314.
Office Action Dated Apr. 12, 2007 From the Israeli Patent Office Re.: Application No. 138314.
Office Action Dated Jul. 19, 2006 From the Israeli Patent Office Re.: Application No. 138314.
Office Action Dated Mar. 22, 2009 From the Israeli Patent Office Re.: Application No. 170492 and Its Translation Into English.

Office Action Dated Sep. 29, 2003 From the Israeli Patent Office Re.: Application No. 136232.
Official Action Dated Feb. 5, 2007 From the US Patent and Trademark Office Re.: U.S. Appl. No. 10/916,380.
Official Action Dated Dec. 14, 2007 From the US Patent and Trademark Office Re.: U.S. Appl. No. 10/916,380.
Official Action Dated Dec. 14, 2007 From the US Patent and Trademark Office Re.: U.S. Appl. No. 10/916,380.
Official Action Dated Nov. 14, 2008 From the US Patent and Trademark Office Re.: U.S. Appl. No. 10/492,531.
Official Action Dated Nov. 14, 2008 From the US Patent and Trademark Office Re.: U.S. Appl. No. 10/492,531.
Official Action Dated Oct. 16, 2006 From the US Patent and Trademark Office Re.: U.S. Appl. No. 10/492,531.
Official Action Dated Dec. 18, 2006 From the US Patent and Trademark Office Re.: U.S. Appl. No. 10/276,080.
Official Action Dated Feb. 19, 2008 From the US Patent and Trademark Office Re.: U.S. Appl. No. 10/492,531.
Official Action Dated Sep. 20, 2007 From the US Patent and Trademark Office Re.: U.S. Appl. No. 10/492,531.
Official Action Dated Mar. 23, 2005 From the US Patent and Trademark Office Re.: U.S. Appl. No. 10/276,080.
Official Action Dated Aug. 25, 2006 From the US Patent and Trademark Office Re.: U.S. Appl. No. 10/276,080.
Official Action Dated Jan. 25, 2007 From the US Patent and Trademark Office Re.: U.S. Appl. No. 10/492,531.
Official Action Dated Aug. 28, 2007 From the US Patent and Trademark Office Re.: U.S. Appl. No. 10/916,380.
Response Dated Apr. 29, 2005 to Communication Pursuant to Article 96(2) EPC of Dec. 23, 2004 From the European Patent Office Re.: Application No. 01934272.4.
Supplementary Partial European Search Report Dated Feb. 20, 2006 From the European Patent Office Re.: Application No. 04714873.9.
Translation of Notice of Reason for Rejection Dated Nov. 27, 2007 From Japanes Patent Office Re.: Application No. 2003-538325.
Translation of Notice of Reason for Rejection Dated Nov. 29, 2007 From the Japanese Patent Office Re.: Application No. 2003-538325.
Written Opinion Dated May 13, 2009 From the International Searching Authority Re.: Application No. PCT/IL08/01492.
Response Dated Jun. 7, 2010 to Official Action of Mar. 5, 2010 From the US Patent and Trademark Office Re.: U.S. Appl. No. 10/561,839.
Baruch et al. "Enzyme Activity—It's All About Image", Trends in Cell Biology, 14(1): 29-35, 2004.
Hestbjerg Hansen et al. "Quantification of Bioavailable Chlortetracycline in Pig Feces Using a Bacterial Whole-Cell Biosensor", Veterinary Microbiology, 87: 51-57, 2002.
Kovacic et al. "Mechanisms of Carcinogenesis: Focus on Oxidative Stress and Electron Transfer", Current Medicinal Chemistry, 8: 773-796, 2001.
Dolbeare "Fluorescent Staining of Enzymes for Flow Cytometry", Methods in Cell Biology, 33(Chap.8): 81-88, 1990.
Klingel et al. "Flow Cytometric Determination of Serine Proteinase Activities in Living Cells With Rhodamine 110 Substrates", Methods in Cell Biology, 41(Chap.29): 449-460, 1994.
Malin-Berdel et al. "Flow Cytometric Determination of Esterase and Phosphatase Activities and Kinetics in Hematopoietic Cells With Fluorogenic Substrates", Cytometry, 1(3): 222-228, 1980.
Nooter et al. "On-Line Flow Cytometry. A Versatile Method for Kinetic Measurement", Methods in Cell Biology, 41(Chap.32): 509-526, 1994.
Turek et al. "Leucine Aminopeptidase Activity by Flow Cytometry", Methods in Cell Biology, 41(Chap.30): 461-468, 1994.
Watson et al. "Enzyme Kinetics", Methods in Cell Biology, 41: 469-508, 1994.
Bedner et al. "Enzyme Kinetic Reactions and Fluorochrome Uptake Rates Measured in Individual Cells by Laser Scanning Cytometry", Cytometry, 33(1): 1-9, 1998. Abstract, P.2, col. 1, §4-col.2, §1, P.8, col. 2, §2.
Sunray et al. "Cell Activation Influences Cell Staining Kinetics", Spectrochimica Part A, 53: 1645-1653, 1997.
Eisenthal et al. "Infection of K562 Cells With Influenza A Virus Increases Their Susceptibility to Natural Killer Lysis", Pathobiology, 65: 331-340, 1997.

Deutsch et al. "Apparatus for High-Precision Repetitive Sequential Optical Measurement of Living Cells", Cytometry, 16: 214-226, 1994.
Sunray et al. "Determination of the Michaelis-Menten Constant (Km) of Intracellular Enzymatic Reaction for Individual Live Lymphocytes", Cytometry Supplement, 10: 68-69, & The XX Congress of the International Society for Analytical Cytology, Montpellier, F, 2000.
Darzynkiewicz et al. "Laser-Scanning Cytometry: A New Instrumentation With Many Applications", Experimental Cell Research, 249(1): 1-12, 1999. Abstract, P.2, col.2, §4-P.4, col. 2, §2, P.8, col.1, §1-col. 2, §2.
Sunray et al. "The Trace and Subgrouping of Lymphocyte Activation by Dynamic Fluorescence Intensity and Polarization Measurements", Biochemical and Biophysical Research Communications, 261(3): 712-719, 1999. Abstract, P.713, col. 1, §5, col. 2, §7-P.714, col. 2, §1.
Sunray et al. "Determination of Individual Cell Michaelis-Menten Constants", Cytometry, 47(1): 8-16, 2002.
Dive et al. "Improved Methodology for Intracellular Enzyme Reaction and Inhibition Kinetics by Flow Cytometry", Cytometry Journal of Society for Analytical Cytology, 8(6): 552-561, 1987.
Koh et al. "Poly(Ethylene Glycol) Hydrogel Microstructures Encapsulating Living Cells", Langmuir, 18(7): 2459-2462, 2002. P.2459-2462, Fig.3.
Lansing Taylor et al. "Real-Time Molecular and Cellular Analysis: The New Frontier of Drug Discovery", Current Opinion in Biotechnology, 12: 75-81, 2001.
Aplin et al. "Protein-Derivatised Glass Coverslips for the Study of Cell-to-Substratum Adhesion", Analytical Biochemistry, 113: 144-148, 1981.
Burlage et al. "Living Biosensors for the Management and Manipulation of Microbial Consortia", Annual Reviews in Microbiology, 48: 291-309, 1994.
Mrksich et al. "Using Self-Assembled Monolayers to Understand the Interactions of Man-Made Surfaces With Proteins and Cells", Annual Reviews in Biophysics and Biomolecular Structure, 25: 55-78, 1996.
Singhvi et al. "Engineering Cell Shape and Function", Science, 264: 696-698, 1994.
Riedel et al. "Arxula Adeninivorans Based Sensor for the Estimation of Bod", Analytical Letters, 31(1): 1-12, 1998.
Simonian et al. "Microbial Biosensors Based on Potentiometric Detection", Methods in Biotechnology, 6(Chap.17): 237-248, 1998.
Arikawa et al. "Microbial Biosensors Based on Respiratory Inhibition", Methos in Biotechnology, 6(Chap.16): 225-235, 1998.
Yamamura et al. "Single-Cell Microarray for Analyzing Cellular Response", Analytical Chemistry, 77(24): 8050-8056, 2005.
Communication Pursuant to Article 94(3) EPC Dated Aug. 9, 2010 From the European Patent Office Re. Application No. 01982673.4.
Communication Pursuant to Article 94(3) EPC Dated Aug. 5, 2010 From the European Patent Office Re. Application No. 05757567.2.
Notice of Allowance Dated Jun. 15, 2010 From the US Patent and Trademark Office Re. U.S. Appl. No. 11/940,996.
Translation of Notice of Reason for Rejection Dated Jul. 23, 2010 From the Japanese Patent Office Re.: Application No. 2006-502647.
Response Dated Aug. 30, 2010 to Official Action of Jul. 13, 2009 From the US Patent and Trademark Office Re.: U.S. Appl. No. 11/660,783.
Response Dated Aug. 30, 2010 to Official Action of Feb. 23, 2010 From the US Patent and Trademark Office Re.: U.S. Appl. No. 12/084,462.
Official Action Dated Sep. 2, 2010 From the US Patent and Trademark Office Re. U.S. Appl. No. 10/565,240.
Official Action Dated Sep. 10, 2010 From the US Patent and Trademark Office Re.: U.S. Appl. No. 11/646,317.
Communication Pursuant to Rules 161(1) and 162 EPC Dated Aug. 25, 2010 From the European Patent Office Re. Application No. 08865081.7.
Official Action Dated Sep. 14, 2010 From the US Patent and Trademark Office Re.: U.S. Appl. No. 11/631,737.
Response Dated Sep. 21, 2010 to Communication Pursuant to Rules 161(1) and 162 EPC of Aug. 25, 2010 From the European Patent Office Re. Application No. 08865081.7.

Official Action Dated Sep. 23, 2010 From the US Patent and Trademark Office Re.: U.S. Appl. No. 10/492,531.
Official Action Dated Sep. 23, 2010 From the US Patent and Trademark Office Re.: U.S. Appl. No. 11/646,294.
Response Dated Oct. 10, 2010 to Notice of Reason for Rejection of Jul. 23, 2010 From the Japanese Patent Office Re.: Application No. 2006-502647.
Communication Pursuant to Article 94(3) EPC Dated Jun. 16, 2009 From the European Patent Office Re.: Application No. 04714873.9.
Office Action Dated Jul. 14, 2009 From the Israeli Patent Office Re.: Application No. 172724 and Its Translation Into English.
Official Action Dated Jul. 13, 2009 From the US Patent and Trademark Office Re.: U.S. Appl. No. 11/660,783.
Official Action Dated Mar. 23, 2005 From the US Patent and Trademark Office Re.: U.S. Appl. No. 10/276,080.
Official Action Dated Jun. 29, 2009 From the US Patent and Trademark Office Re.: U.S. Appl. No. 10/492,531.
Stevens et al. "Quorum Sensing in Vibrio Fischeri: Essential Elements for Activation of the Luminescence Genes", Journal of Bacteriology, 179(2): 557-562, Jan 1997.
Official Action Dated Dec. 9, 2010 From the US Patent and Trademark Office Re. U.S. Appl. No. 10/565,240.
Response Dated Nov. 8, 2010 to Official Action of Sep. 10, 2010 From the US Patent and Trademark Office Re.: U.S. Appl. No. 11/646,317.
Response Dated Nov. 15, 2010 to Official Action Dated Sep. 14, 2010 From the US Patent and Trademark Office Re.: U.S. Appl. No. 11/631,737.
Response Dated Dec. 16, 2010 to Official Action of Aug. 17, 2010 From the US Patent and Trademark Office Re.: U.S. Appl. No. 10/561,839.
Response Dated Dec. 20, 2010 to Official Action of Sep. 23, 2010 From the US Patent and Trademark Office Re.: U.S. Appl. No. 10/492,531.
Response Dated Nov. 30, 2010 to Communication Pursuant to Article 94(3) EPC of Aug. 5, 2010 From the European Patent Office Re. Application No. 05757567.2.
Proceeding Further With the European Patent Application Pursuant to Rule 70(2) Epc Dated Nov. 10, 2009 From the European Patent Office Re. Application No. 04745001.0.
Response Dated Jan. 2, 2011 to Proceeding Further With the European Patent Application Pursuant to Rule 70(2) EPC of Nov. 10, 2009 From the European Patent Office Re. Application No. 04745001.0.
Communication Pursuant to Rule 58 EPC or Rule 159 EPC Dated Nov. 24, 2010 From the European Patent Office Re. Application No. 10183774.8.
Response Dated Jan. 3, 2011 to Communication Pursuant to Rule 58 EPC or Rule 159 EPC of Nov. 24, 2010 From the European Patent Office Re. Application No. 10183774.8.
Official Action Dated Jan. 19, 2011 From the US Patent and Trademark Office Re.: U.S. Appl. No. 11/646,317.
Response Dated Jan. 24, 2011 to Official Action of Sep. 23, 2010 From the US Patent and Trademark Office Re.: U.S. Appl. No. 11/646,294.
Response Dated Jan. 12, 2011 to Office Action of Oct. 5, 2010 From the Israel Patent Office Re. Application No. 184818.
Official Action Dated Feb. 1, 2011 From the US Patent and Trademark Office Re.: U.S. Appl. No. 11/631,737.
Response Dated Jan. 20, 2011 to Official Action of Oct. 27, 2010 From the US Patent and Trademark Office Re.: U.S. Appl. No. 12/890,668.
Response Dated Feb. 7, 2011 to Communication Pursuant to Article 94(3) EPC of Aug. 6, 2010 From the European Patent Office Re.: Application No. 04714873.9.
Office Action Dated Feb. 28, 2011 From the Israel Patent Office Re. Application No. 180568 and Its Translation Into English.
Official Action Dated Mar. 9, 2011 From the US Patent and Trademark Office Re.: U.S. Appl. No. 11/660,783.
Official Action Dated Mar. 16, 2011 From the US Patent and Trademark Office Re. U.S. Appl. No. 10/561,839.
Response Dated Feb. 17, 2011 to Communication Pursuant to Article 94(3) EPC of Aug. 9, 2010 From the European Patent Office Re. Application No. 01982673.4.
Cornell University "All About Birds: Optical Quality", Cornell University, 2 P., Oct. 3, 2010.
Response Dated Feb. 23, 2011 to Official Action of Jan. 19, 2011 From the US Patent and Trademark Office Re.: U.S. Appl. No. 11/646,317.
Official Action Dated Oct. 27, 2010 From the US Patent and Trademark Office Re.: U.S. Appl. No. 12/890,668.
Invitation Pursuant to Article 94(3) and Rule 71(1) EPC Dated Apr. 8, 2011 From the European Patent Office Re. Application No. 01982673.4.
Notice of Allowance Dated Mar. 31, 2011 From the US Patent and Trademark Office Re.: U.S. Appl. No. 12/890,668.
Official Action Dated Mar. 31, 2011 From the US Patent and Trademark Office Re.: U.S. Appl. No. 10/492,531.
Invitation Pursuant to Rule 63(1) EPC Dated May 3, 2011 From the European Patent Office Re. Application No. 10183774.8.
Official Action Dated Apr. 15, 2011 From the US Patent and Trademark Office Re.: U.S. Appl. No. 12/084,462.
Official Action Dated Apr. 22, 2011 From the US Patent and Trademark Office Re.: U.S. Appl. No. 11/646,294.
Notification of European Publication Number and Information on the Applicaiton of Article 67(3) EPC Dated May 18, 2011 From the European Patent Office Re. Application No. 10183774.8.
Official Action Dated May 23, 2011 From the US Patent and Trademark Office Re.: U.S. Appl. No. 11/646,317.
Response Dated May 31, 2011 to Invitation Pursuant to Article 94(3) and Rule 71(1) EPC of Apr. 8, 2011 From the European Patent Office Re. Application No. 01982673.4.
European Search Report and the European Search Opinion Dated Aug. 1, 2011 From the European Patent Office Re. Application No. 10183774.8.
Gonzalez et al. "Cell-Based Assays and Instrumentation for Screening Ion-Channels Targets", Drug Discovery Today, DDT, XP001026838, 4(9): 431-439, Sep. 1, 1999.

* cited by examiner

DEVICE FOR STUDYING INDIVIDUAL CELLS

RELATED APPLICATIONS

This Application is a National Phase of PCT Patent Application No. PCT/IL2005/000801 having International Filing Date of Jul. 26, 2005, which claims the benefit of U.S. Provisional Patent Application No. 60/646,512 filed on Jan. 25, 2005. The contents of the above Applications are all incorporated herein by reference.

FIELD AND BACKGROUND OF THE INVENTION

The present invention relates to the field of cellular biology and more particularly, to an improved device and method for the study of cells. Specifically, the present invention is of a device including a picowell array and capillary fluid conduits.

Combinatorial methods in chemistry, cellular biology and biochemistry are essential for the near simultaneous preparation of multitudes of active entities such as molecules. Once such a multitude of molecules is prepared, it is necessary to study the effect of each one of the active entities on a living organism.

The study of the effects of stimuli such as exposure to active entities on living organisms is preferably initially performed on living cells. Since cell-functions include many interrelated pathways, cycles and chemical reactions, the study of an aggregate of cells, whether a homogenous or a heterogeneous aggregate, does not provide sufficiently detailed or interpretable results: rather a comprehensive study of the biological activity of an active entity may be advantageously performed by examining the effect of the active entity on a single isolated living cells. Thus, the use of single-cell assays is one of the most important tools for understanding biological systems and the influence thereupon of various stimuli such as exposure to active entities.

The combinatorial preparation of a multitudes of active entities coupled with the necessity of studying the effect of each one of the active entities on living organisms using single-cell assays, requires the development of high-throughput single live cell assays. There is a need for the study of real-time responses to stimuli in large and heterogeneous cell populations at an individual cell level. In such studies it is essential to have the ability to define multiple characteristics of each individual cell, as well as the individual cell response to the experimental stimulus of interest.

In the art, various different methods for studying living cells are known.

Multiwell plates having 6, 12, 48, 96, 384 or even 1536 wells on a standard ca. 8.5 cm by ca. 12.5 cm footprint are well known in the art. Such multiwell plates are provided with an 2n by 3n array of rectangular packed wells, n being an integer. The diameter of the wells of a plate depends on the number of wells and is generally greater than about 250 microns (for a 1536 well plate). The volume of the wells depends on the number of wells and the depth thereof but generally is greater than $5 \times 10^{-6}$ liter (for a 1536 well plate). The standardization of the multiwell plate format is a great advantage for researchers, allowing the use of standardized products including robotic handling devices, automated sample handlers, sample dispensers, plate readers, observation components, plate washers, software and such accessories as multifilters.

Multiwell plates are commercially available from many different suppliers. Multiwell plates made from many different materials are available, including but not limited to glass, plastics, quartz and silicon. Multiwell plates having wells where the inside surface is coated with various materials, such as active entities, are known.

Although exceptionally useful for the study of large groups of cells, multiwell plates are not suitable for the study of individual cells or even small groups of cells due to the large, relative to the cellular scale, size of the wells. Cells held in such wells either float about a solution or adhere to a well surface. When cells float about in a well, specific individual cells are not easily found for observation. When cells adhere to a well surface, the cells adhere to any location in the well, including anywhere on the bottom and walls of the well. Such variability in location makes high-throughput imaging (for example for morphological studies) challenging as acquiring an individual cell and focusing thereon is extremely difficult. Such variability in location also makes high-throughput signal processing (for example, detection of light emitted by a single cell through fluorescent processes) challenging as light must be gathered from the entire area of the well, decreasing the signal to noise ratio. Further, a cell held in a well of a multiwell plate well can be physically or chemically manipulated (for example, isolation or movement of a single selected cell or single type of cell, changing media or introducing active entities) only with difficulty. Further, the loading of multiwell plates when loaded with one cell per well, expressed in terms of cells held singly in the wells per unit area is very low (about 1536 cells in 65 cm$^2$, or 24 cells cm$^{-2}$). Thus, multiwell plates are in general only suitable for the study of homogenous or heterogenous aggregates of cells as a group.

Multiwell plates are unsuitable for the study of cells undergoing apoptosis. It is known to study biological processes by exposing a monolayer of cells adhering to the bottom of the well of a multiwell plate to a stimulus that causes apoptosis. However, once a cell begins the apoptosis process, the adhesion of the cell to the bottom of the well is no longer sufficient: the cell detaches from the bottom and is carried away by incidental fluid currents in the well. The cell is no longer observable and its identity lost.

Multiwell plates are also unsuitable for the study of non-adhering cells. Just as cells undergoing apoptosis, in multiwell plates non-adhering cells can be studied as individuals only with difficulty. This is a major disadvantage as non-adhering cells are crucial for research in drug discovery, stem cell therapy, cancer and immunological diseases detection, diagnosis and therapy. For example, blood contains seven heterogeneous types of non-adherent cells, all which perform essential functions, from carrying oxygen to providing immunity against disease.

In the art, a number of method and devices have been developed for the study of individual cells or a small number of cells as a group. Many such methods are based on using picowell-bearing device. A picowell-bearing device is a device for the study of cells that has at least one picowell-bearing component for study of cells. A picowell-bearing component is a component having at least one, but generally a plurality of picowells, each picowell configured to hold at least one cell. The term "picowell" is general and includes such features as dimples, depressions, tubes and enclosures. Since cells range in size from about 1 microns to about 100 (or even more) microns diameter there is no single picowell size that is appropriate for holding a single cell of any type. That said, the dimensions of the typical individual picowell in the picowell-bearing components known in the art have dimensions of between about 1 microns up to about 200 microns, depending on the exact implementation. For example, a device designed for the study of single isolated 20 micron cells typically has picowells of dimensions of about 20 microns. In other cases, larger picowells are used to study the interactions of a few cells held together in one picowell. For example, a 200 micron picowell is recognized as being useful for the study of the interactions of two or three cells, see PCT Patent Application No. IL01/00992 published as WO 03/035824.

One feature that increases the utility of a picowell-bearing device is that each individual picowell is individually addressable. By individual addressability is meant that each picowell can be registered, found, observed or studied without continuous observation. For example, while cells are held in picowells of a picowell-bearing component, each cell is characterized and the respective picowell wherein that cell is held is noted. When desired, the observation component of the picowell-bearing device is directed to the location of the picowell where a specific cell is held. One method of implementing individual addressability is by the use of fiducial points or other features (such as signs or labels), generally on the picowell-bearing component. Another method of implementing individual addressability is by arranging the picowells in a picowell-array and finding a specific desired picowell by counting. Another method of implementing individual addressability is by providing a dedicated observation component for each picowell.

In the art, the picowell-bearing component of a picowell-bearing device is often a chip, a plate or other substantially planar component. Herein such a component is termed a "carrier". In the art, there also exist non-carrier picowell-bearing components of picowell-bearing devices, for example, bundles of fibers or bundles of tubes.

Mrksich and Whitesides, *Ann. Rev. Biophys. Biomol. Struct.* 1996, 25, 55-78; Craighead et al., *J. Vac. Sci. Technol.* 1982, 20, 316; Singhvi et al., *Science* 1994, 264, 696-698; Aplin and Hughes, *Analyt. Biochem.* 1981, 113, 144-148 and U.S. Pat. No. 5,324,591 all teach devices including arrays of spots of cell-attracting or cell-binding entities on a plate. In such devices, the spots serve as picowells, binding cells through a variety of chemical bonds. In such devices, the plate is the picowell-bearing component of the device. Due to the size of the spots, each such picowell generally holds more than one cell. To reduce interaction between cells held at different picowells, the spots must be spaced relatively far apart, reducing loading as expressed in terms of picowells per unit area. Even with generous spacing, in such picowell-bearing components held cells are not entirely isolated from mutual interaction, nor can cells be subject to individual manipulation. The fact that the cells are not free-floating but are bound to the plate through some interaction necessarily compromises the results of experiments performed.

In U.S. Pat. No. 6,103,479, the picowell-bearing component is a transparent carrier provided with a non-uniform array of picowells, each well functionalized with chemical entities that bind to cells specifically or non-specifically. Each picowell is of approximately 200 to 1000 micron diameter and is configured to hold a plurality of cells. The inter picowell areas are hydrophobic so as not to attract cells. In addition to the carrier, a device of U.S. Pat. No. 6,103,479 is provided with a glass, plastic or silicon chamber-bearing plate in which individually addressable microfluidic channels are etched, the chamber-bearing plate configured to mate with the carrier. When mated, the carrier and chamber-bearing plate constitute a cassette in which each cell is bound to the carrier and isolated in a chamber provided with an individual fluid delivery system. Reagents are provided through the fluid delivery system and observed by the detection of fluorescence. In order to provide space for the walls of the chambers, the inter picowell areas of the carrier are relatively large, reducing loading as expressed in terms of picowells per unit area. Subsequent to study, the cassette is separated into the two parts and the micro-patterned array of cells processed further. In some embodiments, the chamber-bearing plate is made of polytetrafluoroethylene, polydimethylsiloxane or an elastomer. As held cells do not make contact with the chamber-bearing plate it is not clear what advantages are to be had when providing a chamber-bearing plate of such esoteric materials.

In U.S. patent application Ser. No. 10/199,341, a device is taught for trapping a plurality of dielectric objects (such as cells), each individual object in an individual light beam produced by an optical array.

In U.S. Pat. No. 4,729,949, a device is taught for trapping individual cells in a picowell-bearing carrier, the carrier being substantially a plate having a plurality of picowells that are individually-addressable tapered apertures of a size to hold individual cells. Suction applied from the bottom surface of the plate where the picowells are narrow creates a force that draws cells suspended in a fluid above the carrier into the wide end of the picowells on the surface of the carrier to be held therein. Using the teachings of U.S. Pat. No. 4,729,949 a specific group of cells (having dimensions similar to that of the wide end of the picowells) are selected from amongst a group of cells and held in the carrier. Although the cells are subjected to common stimuli, the fact that the picowells are individually addressable allows the effect of a stimulus on an individual cell to be observed. A carrier of U.S. Pat. No. 4,729,949, is generally made of metal such as nickel and prepared using standard photoresist and electroplating techniques. In a carrier of U.S. Pat. No. 4,729,949, the inter picowell areas of the carrier are relatively large, leading to a low loading as expressed in terms of picowells per unit area. Further, the suction required to hold cells in picowells of a carrier of U.S. Pat. No. 4,729,949 deforms held cells and makes a significant portion of the cell membranes unavailable for contact, both factors that potentially compromise experimental results. Study of cells held in a carrier of U.S. Pat. No. 4,729,949 with methods not based on detecting fluorescence generally gives poor results due to reflections of light from the carrier.

In PCT Patent Application No. US99/04473 published as WO 99/45357 is taught a picowell-bearing component produced by etching the ends of a bundle of optical fibers (apparently of glass) while leaving the cladding intact to form a picowell-bearing component that is a bundle of tubes. The size of the hexagonal picowells is demonstrated to be as small as 7 micron wide, 5 micron deep and having a volume of about $1.45 \times 10^{-13}$ liter. The inter picowell area is quite large due to the thickness of the cladding of the optical fibers. Light emitted by cells held in each picowell are independently observable through a respective optical fiber. In some embodiments, the inside surface of the picowells is coated with a film of materials such as collagen, fibronectin, polylysine, polyethylene glycol, polystyrene, fluorophores, chromophores, dyes or a metal. Loading the picowell-bearing component of PCT Patent Application No. US99/04473 includes dipping the optical fiber bundle in a cell suspension so that cells adhere to the picowells. There are a number of disadvantages to the teachings of PCT Patent Application No. US99/04473. The fact that the cells are studied only subsequent to adhesion to the picowells necessarily influences the results of experiments performed. Since cell proliferation generally begins soon after adhesion, it is not known if a detected signal is produced by a single cell or a plurality of cells. It is is not clear where exactly in a picowell a cell is held and therefore what percentage of light emitted from a cell travels to a detector. The fact that emitted light travels through an optical fiber leads to loss of time-dependent and phase information.

In unpublished PCT Patent Application No. IL04/00192 of the Applicant filed 26 Feb. 2004 is taught a picowell-bearing component produced by bundling together glass capillaries, each glass capillary attached to an independent fluid flow generator such as a pump. A cell held in a first picowell is transferred to a second picowell by the simultaneous application of an outwards flow from the first picowell and an inwards flow into the second picowell.

A preferred device for the study of cells is described in PCT Patent Application No. IL01/00992 published as WO 03/035824 of the Applicant. The device 10, depicted in FIG. 1, is provided with a transparent carrier 12 as a picowell-bearing component. Carrier 12 is substantially a sheet of transparent material (such as glass or polystyrene) on the surface of which features such as inlet connectors 14, fluid channels 16, picowells (in FIG. 1, a picowell-array 18), a fluid reservoir 20 and an outlet connector 22. Carrier 12 is immovably held in a holder 24 having a cutout window of a size and shape to accept carrier 12. Other components of device 10 not depicted include flow generators, observation components, external tubing and the like. When a cover slip (not depicted) is placed or integrally formed with carrier 12, fluid channels 16, picowell-array 18 and reservoir 20 are sealed forming channels that allow transport of fluids and reagents to cells held in picowell-array 18. The picowells are configured to hold a predetermined number of cells (one or more) of a certain size and are preferably individually addressable both for examination and manipulation.

FIG. 2 is a reproduction of a photograph of a different carrier 26 held in a holder 24. A first syringe 28 as an inlet flow generator is in communication with an inlet connector 14 by a capillary tube 30. Inlet connector 14 is in fluid communication with picowell-array 18 through a fluid passage. Picowell-array 18 is in fluid communication with outlet connector 22 through a fluid passage. A second syringe 32 as an outlet flow generator is in communication with outlet connector 22 through capillary tube 34.

PCT Patent Application No. IL01/00992 also teaches methods of physically manipulating cells held in a picowell-bearing device using, for example, individually addressable microelectrodes (found in the picowells or in the cover slip) or optical tweezers. Typical physical manipulations include moving selected cells into or out of specific picowells. One useful method that is implemented using a device of PCT Patent Application No. IL01/00992 is that cells, each held alone in a respective picowell, are examined (either in the presence or absence of reagents) and based on the results of the examination, cells with a certain characteristic are selected to remain in a respective picowell while cells without the certain characteristic are removed from a respective picowell and ejected by the application of a flow in parallel to the surface of the carrier, generated by a flow generator.

An additional feature of the teachings of PCT Patent Application No. IL10/00992 is that, in some embodiments, the picowells are juxtaposed, that is, the area occupied by a picowell-array is substantially entirely made up of picowells with little or no inter picowell area, see FIG. 3. FIG. 3 is a reproduction of a photograph of part of a picowell-array 18 from the top of a carrier 12 of PCT Patent Application No. IL01/00992. In FIG. 3 is seen a plurality of hexagonal picowells 36, some populated with living cells 38. It is seen that the inter picowell areas 40 make up only a minor percentage of the total area of picowell-array 18. This feature allows near tissue-density packing of cells, especially in single-cell picowell configurations. For example, a typical device of PCT Patent Application No. IL10/00992 having a 2 mm by 2 mm picowell-array of hexagonally-packed juxtaposed picowells of 10 micron diameter and no inter picowell area includes about 62000 picowells while a device having a 2 mm by 2 mm picowell-array of hexagonally-packed juxtaposed picowells of 20 micron diameter and no inter picowell area includes about 10000 picowells.

This feature also allows simple picowell loading: a fluid containing suspended cells is introduced in the volume above the picowell array. Since there is little inter picowell area, cells settle in the picowells.

Despite the unparalleled utility of a device 10 of PCT Patent Application No. IL01/00992 as depicted in FIG. 1 and FIG. 2, a device such as 10 has a number of disadvantages. A first disadvantage is one of complexity. The necessity for flow generators (e.g., syringes 28 and 32) and concomitant interfaces of dissimilar materials increases the complexity of device 10, increases the effort and expense required in fashioning device 10 and increases the difficulty of the use of device 10. A second disadvantage is that the difficulties in the use of the device including loading, attaching flow generators and the like render the integration of a device 10 with a robotics system for fully automatised use impractical.

It would be highly advantageous to have a device for the study of cells not having at least some of the disadvantages of the prior art.

SUMMARY OF THE INVENTION

The present invention successfully addresses at least some of the shortcomings of the prior art by providing a picowell-bearing device for the study of cells. One of the primary advantages of a device of the present invention is the simplicity of manufacture and ease of use.

This simplicity allows the device to be disposable, an advantage when studying dangerous biological substances such as pathogenic agents.

Thus according to the teachings of the present invention there is provided a picowell-bearing device comprising a picowell array and a capillary channel in fluid communication therewith consisting essentially of no more than four components.

In an embodiment of the present invention the device consists essentially of four components: a) a carrier with an upper surface having a depression in the upper surface, b) a picowell-bearing component bearing the picowell array placed in the depression, c) a lid configured to rest above the picowell array and d) a lid holder configured to rest above the lid and to engage the carrier so as to secure the lid to the carrier.

In an embodiment of the present invention the device consists essentially of three components: a) a carrier with an upper surface bearing a picowell array on the upper surface, c) a lid configured to rest above the picowell array and d) a lid holder configured to rest above the lid and to engage the carrier so as to secure the lid to the carrier.

In an embodiment of the present invention the device consists essentially of three components: a) a carrier with an upper surface having a depression in the upper surface, b) a picowell-bearing component bearing the picowell array placed in the depression, and c) a lid configured to rest above the picowell array.

In an embodiment of the present invention the device consists essentially of two components: a) a carrier with an upper surface bearing a picowell array on the upper surface and c) a lid configured to rest above the picowell array.

According to the teachings of the present invention there is also provided a picowell-bearing device comprising a) a carrier, having an upper surface, b) a picowell array on the upper surface, (preferably made up of a plurality of picowells), c) a fluid reservoir in fluid communication with the picowell array through at least one capillary channel and d) a lid configured to rest above the picowell array, preferably substantially in parallel to the upper surface.

In an embodiment of the present invention, the picowell array is located in a depression on the upper surface of the carrier.

In an embodiment of the present invention, the picowell array is a feature on the upper surface of the carrier.

In an embodiment of the present invention, the capillary channel is located on the upper surface of the carrier, for example as a groove or other recessed feature on the upper surface. In a preferred embodiment, the device includes a plateau on the upper surface of the carrier, wherein at least part of the plateau constitutes at least part of the capillary channel.

Preferably the lid is a component of the capillary channel, for example by serving as one of the walls defining the capillary channel. In an embodiment of the present invention where a plateau on the upper surface constitutes a part of the capillary channel, the capillary channel is defined by the gap between the lid and the plateau.

In an embodiment of the present invention, the fluid reservoir is located on the upper surface of the carrier, for example as a substantially planar area or as a recessed feature on the upper surface. Preferably the lid is a component of the fluid reservoir, for example by serving as one of the walls defining the fluid reservoir.

In a preferred embodiment of the present invention varying the position of the lid relative to the carrier (and generally to the picowell array, to the capillary channel or to the fluid reservoir) varies the characteristics of the fluid communication between the fluid reservoir and the picowell array.

In an embodiment of the present invention, the lid is removable.

In an embodiment of the present invention, the lid is moveable relative to the carrier (and generally to the picowell array, to the capillary channel or to the fluid reservoir). In an embodiment of the present invention, the lid is moveable substantially in parallel to the upper surface of the carrier. In an embodiment of the present invention, the lid is slidingly associated with the carrier. In an embodiment of the present invention, the lid is provided with a feature (e.g., a notch, a depression, a slot, a protuberance, a loop, a recess, a handle) configured to engage a force-applying device used to move the lid relative to the carrier.

According to a feature of the present invention, the lid has at least two, preferably at least three, substantially different rest positions relative to the picowell array. Such rest positions include, for example, a rest position for loading cells into the picowell array, a rest position where the fluid reservoir, the channel and the picowell array are sealed or substantially sealed from the environment to reduce evaporation of fluids, and a rest position to allow addition of fluids to the fluid reservoir. In an embodiment of the present invention, the rest positions are predetermined. In an embodiment of the present invention, the device is provided with an indicator to indicate that the lid is found at least one (preferably all) of the predetermined rest positions. In an embodiment of the present invention the indicator includes markings on the carrier and/or on the lid.

In an embodiment of the present invention, the carrier further comprises at least two rails, the picowell array is located between the two rails (preferably in a depression between the two rails or as a feature on the upper surface between the two rails) and the lid is slidingly associated with the two rails. Preferably, the lid and an area between the two rails substantially define a capillary channel. In an embodiment the rails are substantially grooves in walls protruding from the upper surface.

In an embodiment of the present invention, the device includes a capillary waste channel in fluid communication with the picowell array. In a preferred embodiment, the device includes a plateau on the upper surface of the carrier, wherein at least part of the plateau constitutes at least part of the capillary waste channel. In an embodiment of the present invention where a plateau on the upper surface constitutes a part of the capillary waste channel, the capillary waste channel is defined by the gap between the lid and the plateau.

In a preferred embodiment, the device includes a plateau on the upper surface of the carrier, where the picowell array is found on the plateau (e.g., as a feature on the plateau or within a depression in the plateau), where a first region of the plateau constitutes a part of the capillary channel ("upstream" from the picowell array) and a second region of the plateau constitutes a part of the waste capillary channel ("downstream" from the picowell array).

In an embodiment of the present invention, the device includes a waste reservoir in fluid communication with the capillary waste channel. In a preferred embodiment, the device includes a plateau on the upper surface of the carrier, wherein at least part of the plateau constitutes at least part of the waste reservoir. In an embodiment of the present invention the waste capillary channel is in fluid communication (directly or indirectly through a waste reservoir) with an absorbent element (e.g., sponge, blotting paper, aggregated fibers).

According to the teachings of the present invention there is also provided a picowell-bearing device comprising a) a carrier having an upper surface, b) a picowell array on the upper surface, (preferably made up of a plurality of picowells), c) a fluid reservoir in fluid communication with the picowell array through at least one channel; and d) a lid resting above the picowell array, configured to move relative to the carrier substantially in parallel to the upper surface.

In an embodiment of the present invention the picowell array is located in a depression on the upper surface.

In an embodiment of the present invention, the picowell array is a feature on the upper surface of the carrier.

In an embodiment of the present invention, the channel is located on the upper surface of the carrier, for example as a groove or other recessed feature on the upper surface. Preferably the lid is a component of the channel, for example by serving as one of the walls defining the channel.

In an embodiment of the present invention, the lid is slidingly associated with the carrier. In an embodiment of the present invention, the lid is provided with a feature (e.g., a notch, a depression, a slot, a protuberance, a loop, a recess, a handle) configured to engage a force-applying device used to move the lid relative to the carrier.

According to a feature of the present invention, the lid has at least two, preferably at least three, substantially different rest positions relative to the picowell array. Such rest positions include, for example, a rest position for loading cells into the picowell array, a rest position where the fluid reservoir, the channel and the picowell array are sealed or substantially sealed from the environment to reduce evaporation of fluids, and a rest position to allow addition of fluids to the fluid reservoir. In an embodiment of the present invention, the rest positions are predetermined. In an embodiment of the present invention, the device is provided with an indicator to indicate that the lid is found at least one (preferably all) of the predetermined rest positions. In an embodiment of the present invention the indicator includes markings on the carrier and/or on the lid.

In an embodiment of the present invention, the carrier further comprises at least two rails, the picowell array is located between the two rails (preferably in a depression between the two rails or as a feature on the upper surface between the two rails) and the lid is slidingly associated with the two rails. In an embodiment the rails are substantially grooves in walls protruding from the upper surface.

In an embodiment of the present invention, the device includes a waste channel in fluid communication with the picowell array. In an embodiment of the present invention, the device includes a waste reservoir in fluid communication with the waste channel. In an embodiment of the present invention the waste channel is in fluid communication (directly or indirectly through a waste reservoir) with an absorbent element (e.g., sponge, blotting paper, aggregated fibers).

According to the teachings of the present invention there is also provided a device for the automatized study of cells comprising a picowell-bearing device having a picowell array, a moveable (preferably slidable) lid functionally associated with the picowell-bearing device having at least two rest positions, a first rest position where the picowell array is open to the environment and a second rest position where the picowell array is isolated from the environment, a lid-moving component configured to move the lid to the first rest position and to the second rest position, at least one fluid dispensing component and a control system functionally associated with the lid-moving component and the at least one fluid dispensing component, the control system configured to operate substantially automatically.

In an embodiment of the present invention, at least one of the fluid dispensing devices is associated with a single fluid reservoir and is configured to dispense only one type of fluid from that reservoir. In an embodiment of the present invention, at least one of the fluid dispensing devices is associated with more than one fluid reservoirs and is configured to dispense fluids from the more than one reservoirs. Preferably, at least one fluid dispensing device is configured to dispense a fluid containing cells to the picowell-array, preferably when the lid is in the first rest position. Preferably, at least one fluid dispensing device is configured to dispense a fluid when the lid is in the second rest position.

In an embodiment of the present invention, the device further comprises an observation device, preferably functionally associated with the control system.

In an embodiment of the present invention, the device further comprises a transport component configured to change the position of the picowell-bearing device relative to the at least one fluid dispensing component. In an embodiment of the present invention, the transport component is configured to move the fluid dispensing component (e.g., a moving liquid dispensing needle as is known in the art of "autosamplers"). In an embodiment of the present invention, the transport component is configures to move the picowell-bearing device (e.g., a conveyor belt and the like).

BRIEF DESCRIPTION OF THE DRAWINGS

The file of this patent contains at least one drawing executed in color photograph. Copies of this patent with color photograph(s) will be provided by the Patent and Trademark Office upon request and payment of necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 (prior art) depicts a picowell-bearing device for the study of cells of PCT Patent Application No. IL01/00992 including a transparent carrier;

FIG. 2 (prior art) is a reproduction of a photograph of a picowell-bearing device of PCT Patent Application No. IL01/00992;

FIG. 3 (prior art) is a reproduction of a photograph of a cell-populated well-array of a carrier of a picowell-bearing device of PCT Patent Application No. IL01/00992;

FIGS. 4A, 4B and 4C depict an embodiment of a picowell-bearing device for the study of cells of the present invention;

FIG. 5 depicts loading of a picowell array of a picowell-bearing device of the present invention with cells;

FIG. 6 depicts settling of cells loaded onto a picowell array of a picowell-bearing device of the present invention;

FIG. 7 depicts a plurality of cells held in picowells of a picowell array of a picowell-bearing device of the present invention;

FIG. 8 depicts a picowell-bearing device of the present invention where the picowell array is open to the environment;

FIG. 9 depicts the lid of a picowell-bearing device of the present invention being slidingly translated to a predetermined rest position on the carrier;

FIG. 10 depicts the addition of a washing solution to the fluid reservoir of a picowell-bearing device of the present invention in order to wash cells held in the respective picowell array;

FIG. 11 depicts the addition of a staining solution to the fluid reservoir of a picowell-bearing device of the present invention in order to stain cells held in the respective picowell array;

Figure 12:
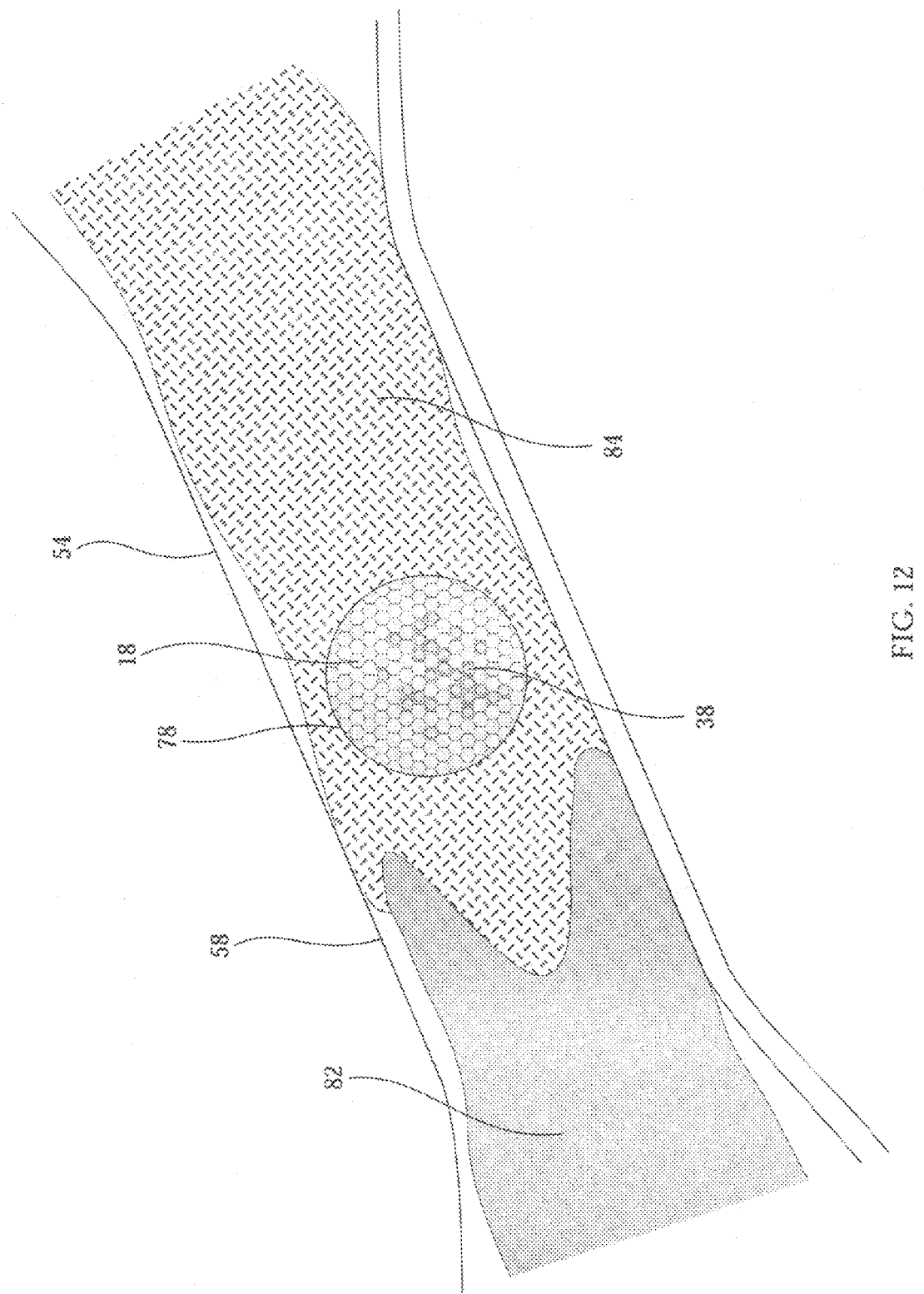

FIG. 12 depicts a picowell array of a picowell-bearing device of the present invention from a top view showing a staining solution displacing a washing solution in the respective picowell array.

Figure 13:
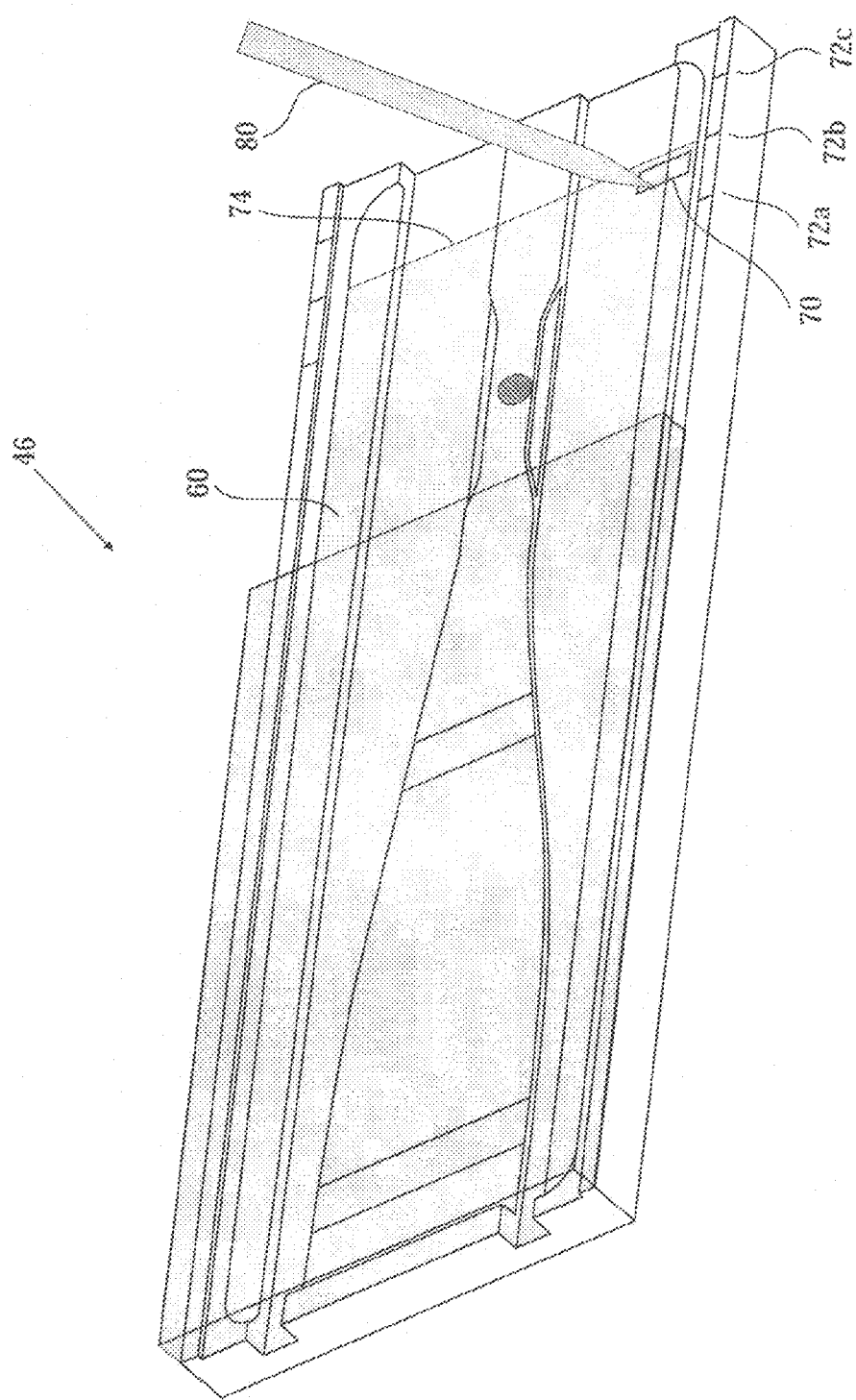
Figure 14:
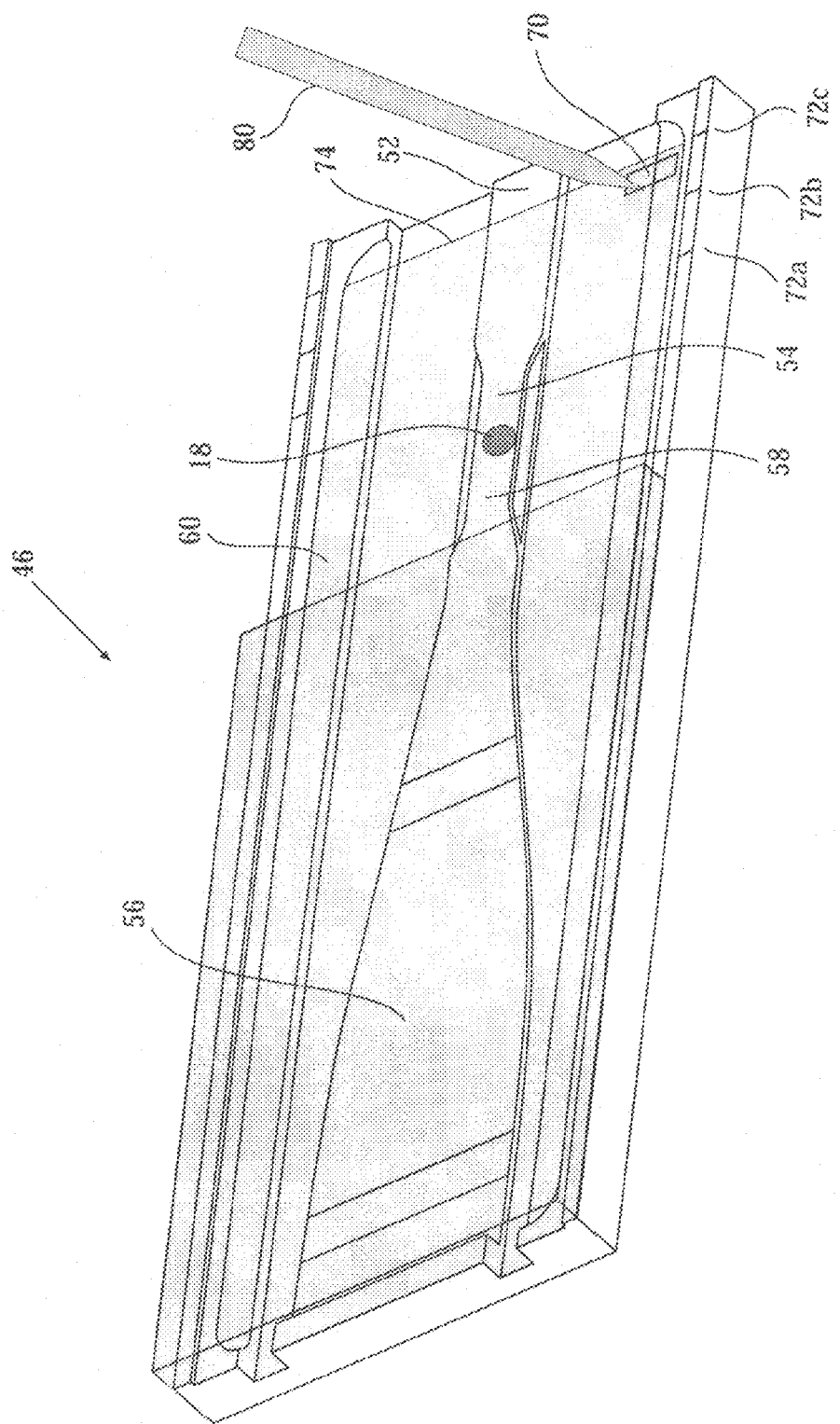
Figure 15:
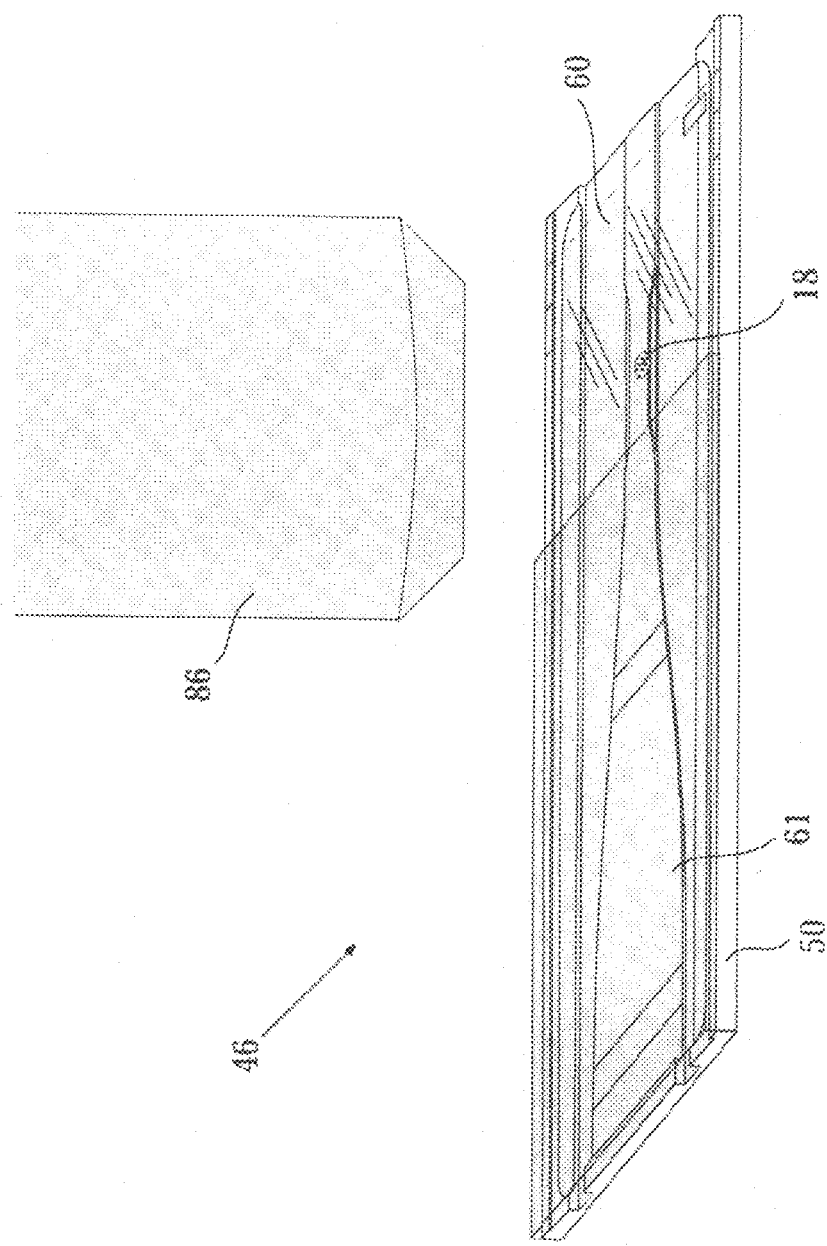
Figure 16:
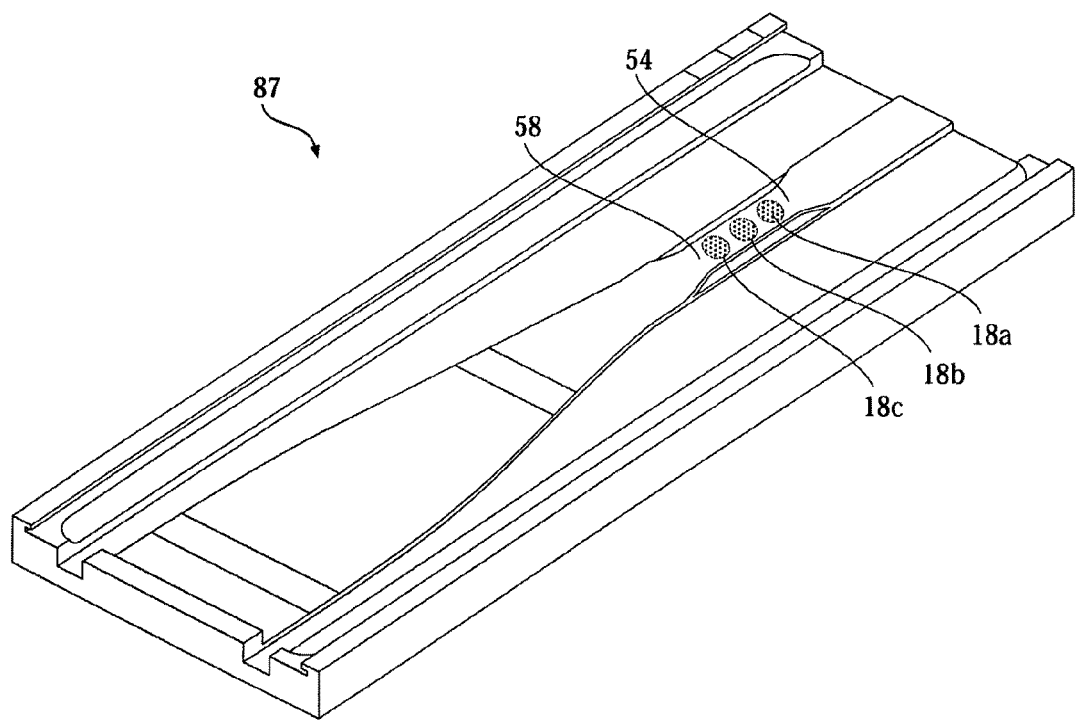
Figure 17:
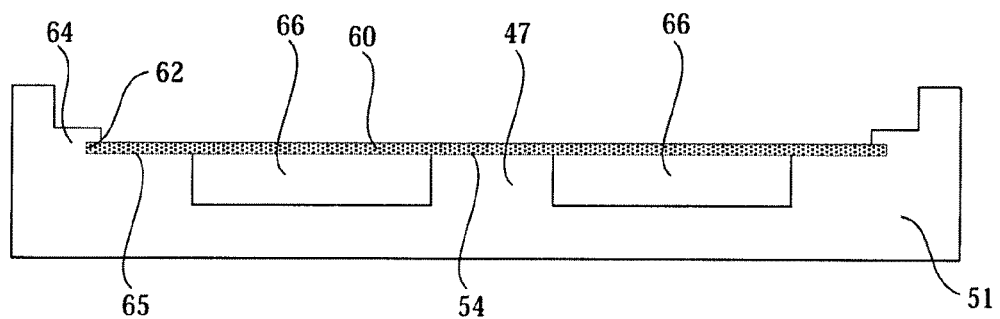
Figure 18:
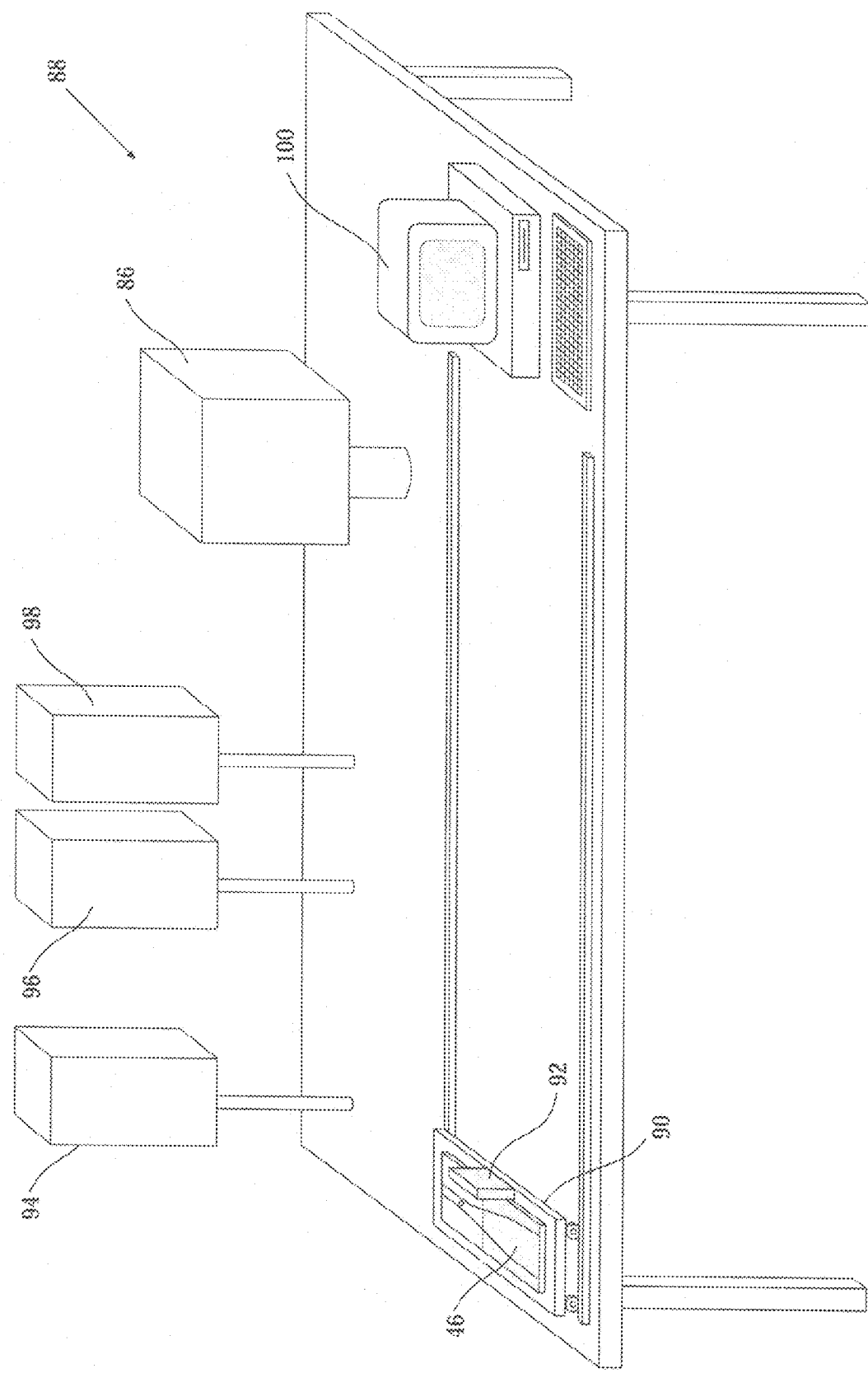

FIG. 13 depicts the lid of a picowell-bearing device of the present invention being slidingly translated to a predetermined rest position on the carrier;

FIG. 14 depicts the lid of a picowell-bearing device of the present invention being slidingly translated to a predetermined rest position on the carrier to substantially seal the fluid reservoir, the capillary channel and the picowell array from the environment to reduce evaporation of fluids;

FIG. 15 depicts an observation device in use to study cells held in a picowell array of the present invention;

FIG. 16 depicts an embodiment of a picowell-bearing device of the present invention having three picowell arrays;

FIG. 17 depicts an embodiment of a picowell-bearing device of the present invention having a lid engaging grooves in the respective carrier;

FIG. 18 depicts a device for the automated study of cells of the present invention including a picowell-bearing device, a moveable lid, a lid-moving component, three fluid dispensing components and a control system.

Figure 19:
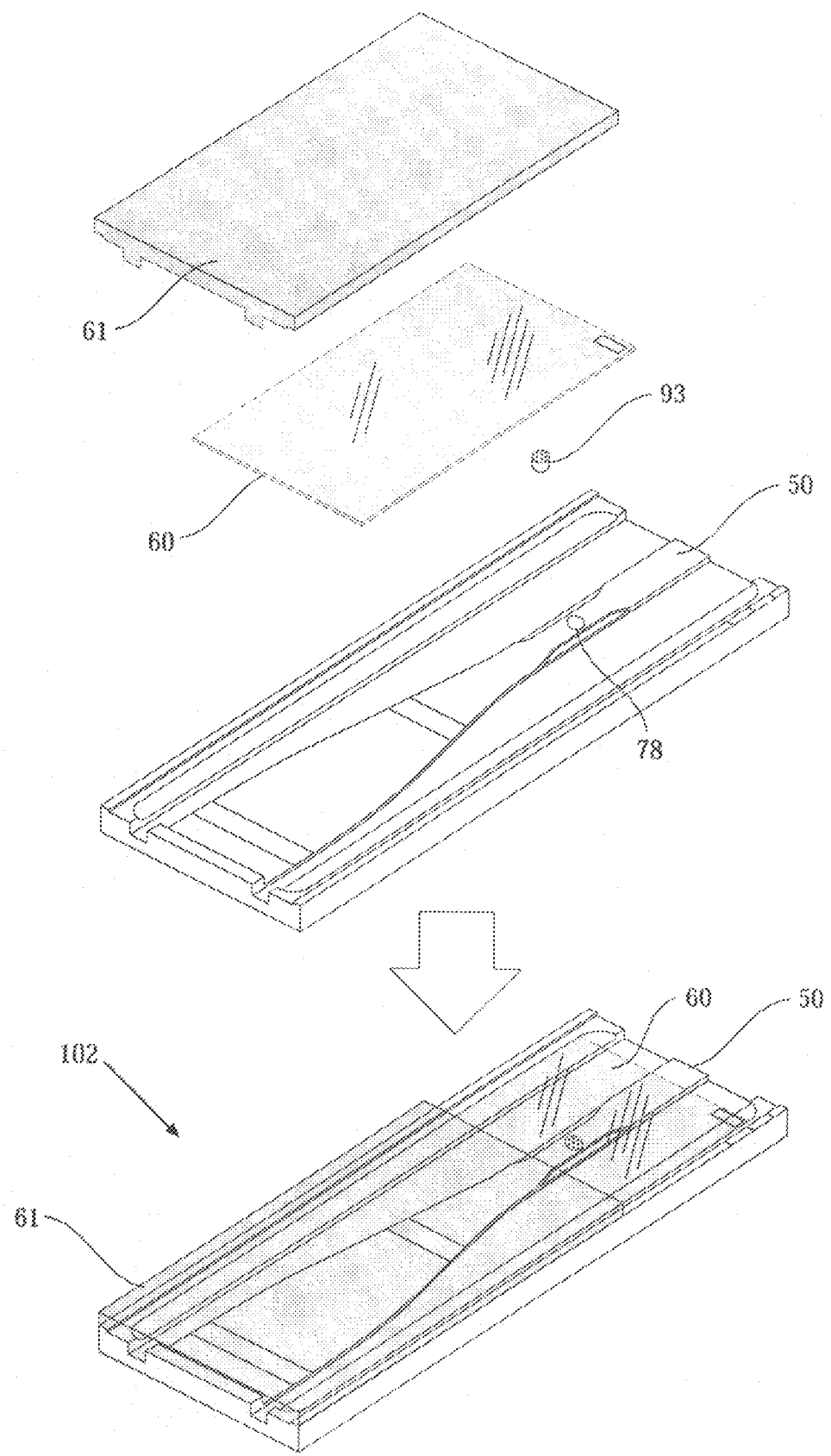
Figure 20:
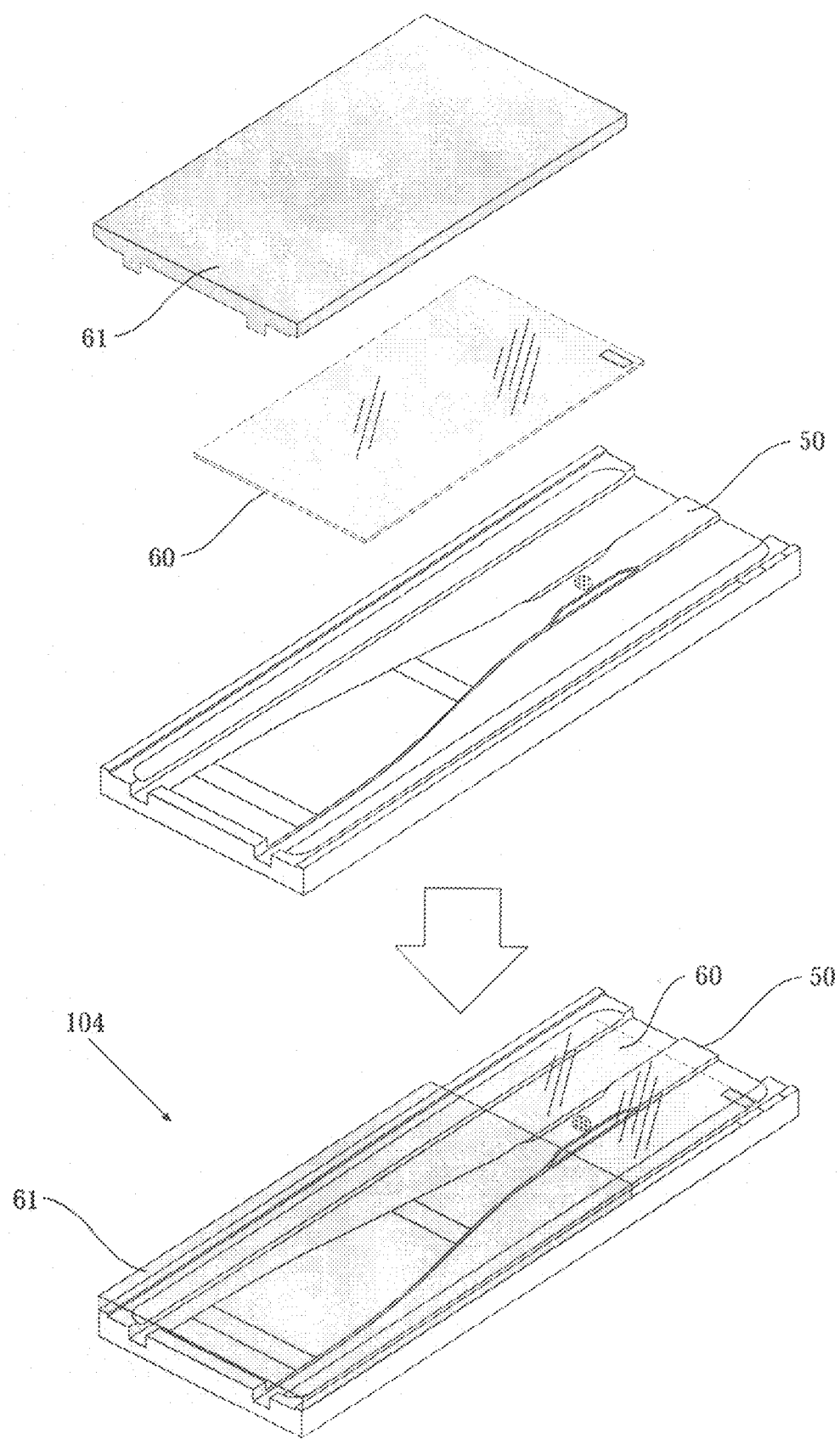
Figure 21:
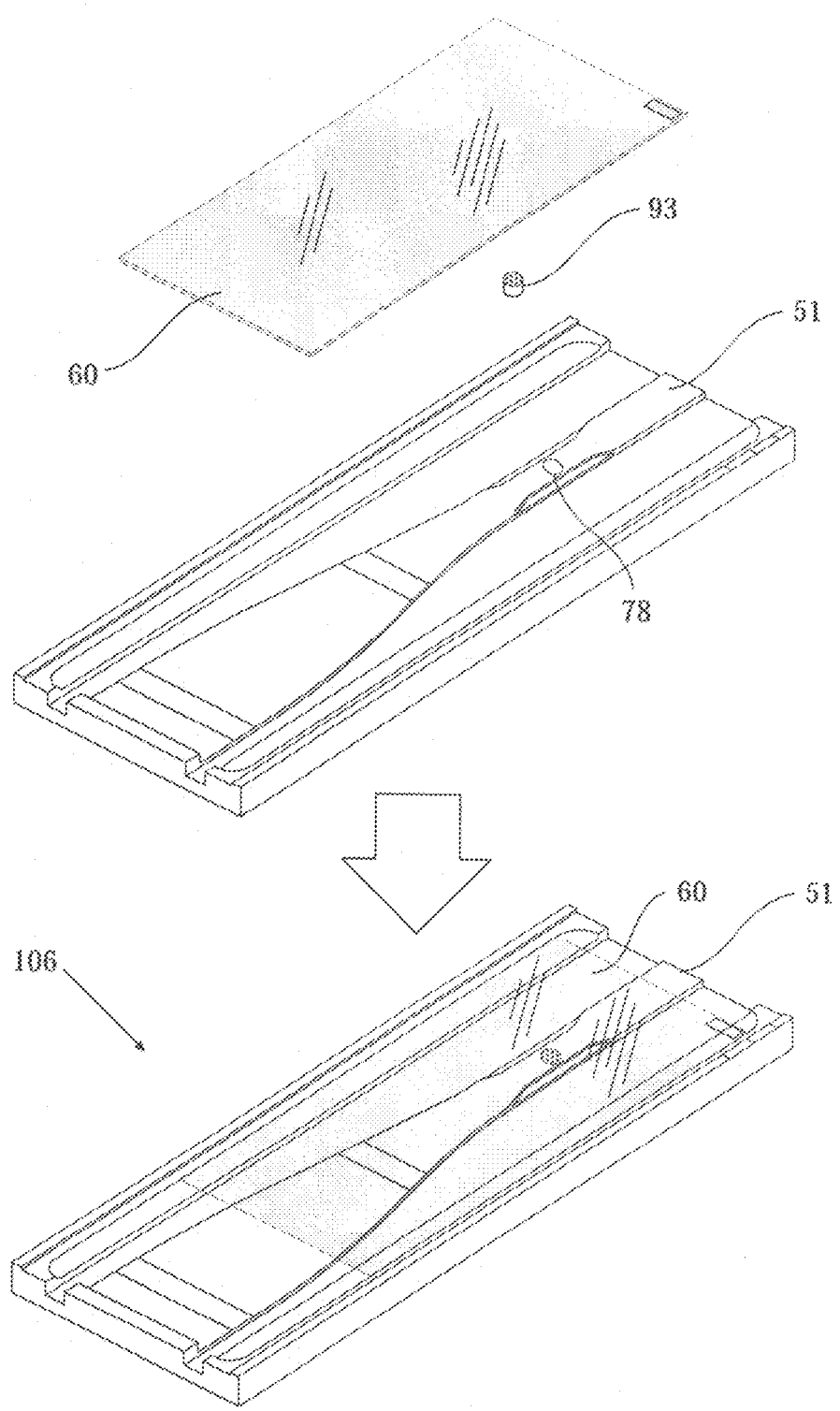
Figure 22:
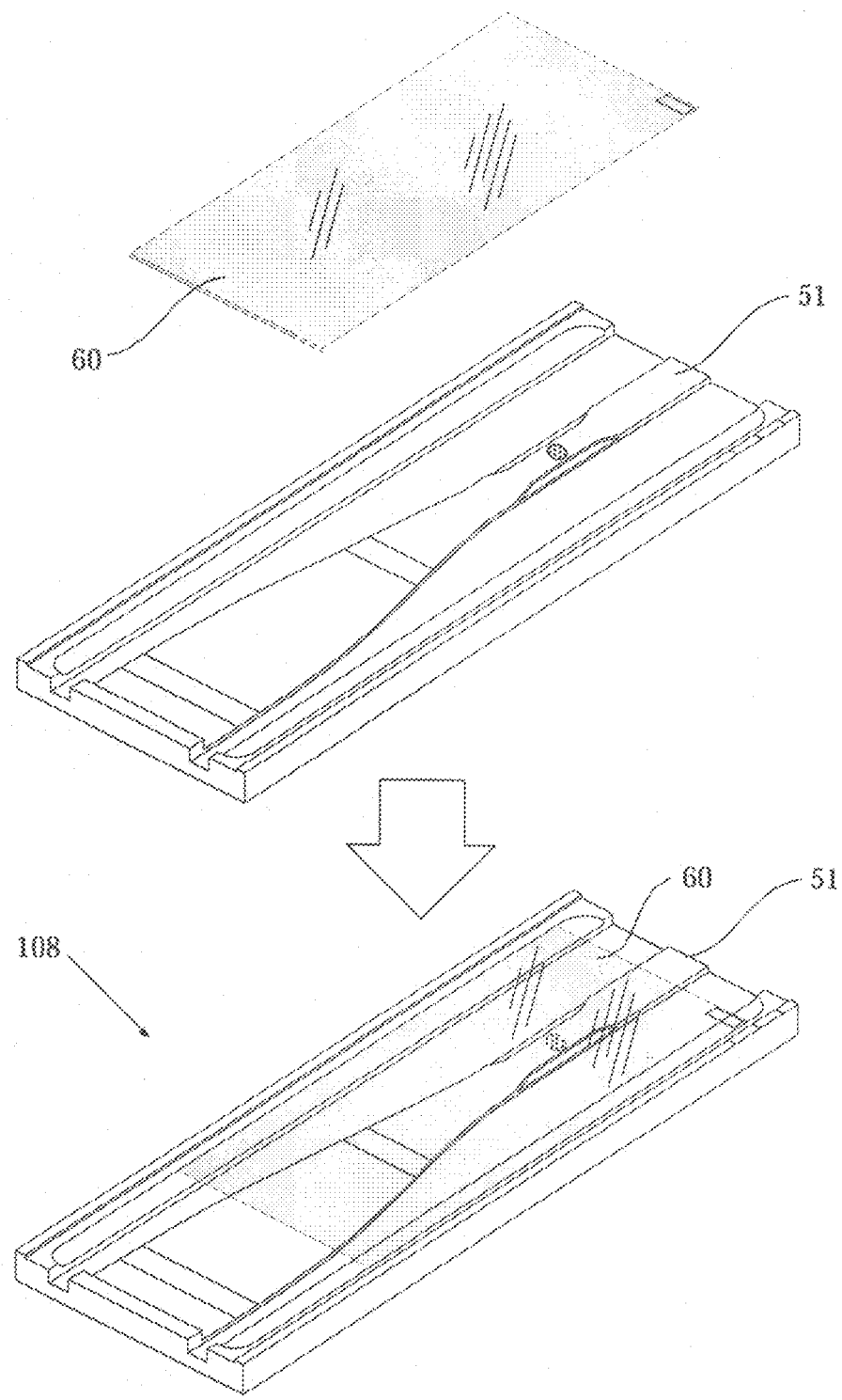
Figure 23:
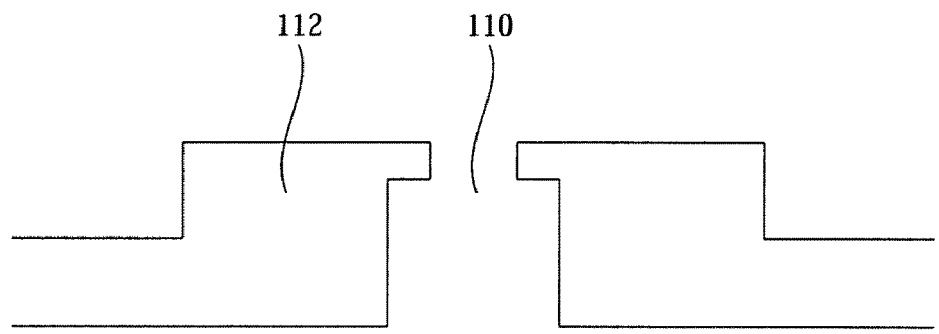
Figure 23:
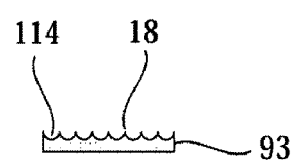
Figure 23:
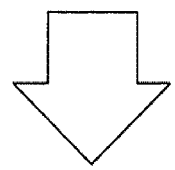
Figure 23:
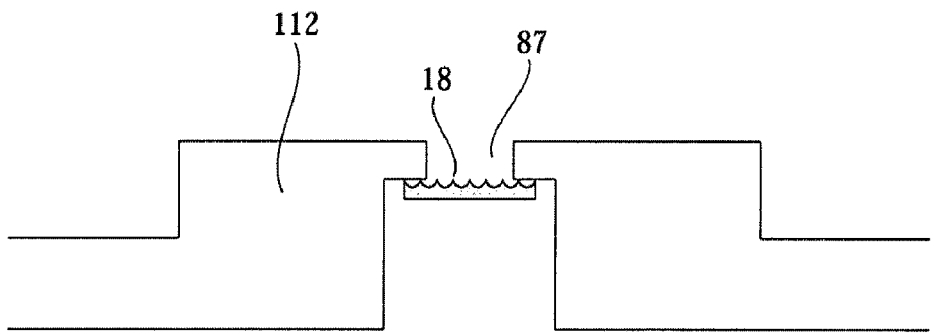

FIG. 19 depicts an embodiment of a picowell-bearing device of the present invention consisting essentially of four components;

FIG. 20 depicts an embodiment of a picowell-bearing device of the present invention consisting essentially of three components;

FIG. 21 depicts an embodiment of a picowell-bearing device of the present invention consisting essentially of three components;

FIG. 22 depicts an embodiment of a picowell-bearing device of the present invention consisting essentially of two components; and FIG. 23 depicts an embodiment of a picowell-bearing device of the present invention having a carrier thinned in the vicinity of the picowell array in cross section from the side.

PREFERRED EMBODIMENTS OF THE INVENTION

The present invention is of a picowell-bearing device for the study of cells including a picowell array and a fluid reservoir in fluid communication with the picowells through capillary channels. The present invention is also of a picowell-bearing device for the study of cells including a picowell array and a movable lid. The present invention is also of an automatized method for studying cells. The present invention is also of a device for the automatized study of cells including a picowell-bearing device having a picowell array, a moveable lid associated with the picowell-bearing device, a lid-moving component, at least one fluid dispensing component and a control system configured to operate substantially automatically.

The principles and uses of the teachings of the present invention may be better understood with reference to the accompanying description, figures and examples. In the figures, like reference numerals refer to like parts throughout.

Before explaining at least one embodiment of the invention in detail, it is to be understood that the invention is not limited in its application to the details set forth herein. The invention can be implemented with other embodiments and can be practiced or carried out in various ways. It is also understood that the phraseology and terminology employed herein is for descriptive purpose and should not be regarded as limiting.

Generally, the nomenclature used herein and the laboratory procedures utilized in the present invention include techniques from the fields of biology, chemistry, engineering and physics. Such techniques are thoroughly explained in the literature.

Unless otherwise defined, all technical and scientific terms used herein have the same meaning as commonly understood by one of ordinary skill in the art to which the invention belongs. In addition, the descriptions, materials, methods, and examples are illustrative only and not intended to be limiting. Methods and materials similar or equivalent to those described herein can be used in the practice or testing of the present invention.

As used herein, the terms "comprising" and "including" or grammatical variants thereof are to be taken as specifying the stated features, integers, steps or components but do not preclude the addition of one or more additional features, integers, steps, components or groups thereof. This term encompasses the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts. Implementation of the methods of the present invention involves performing or completing selected tasks or steps manually, automatically, or a combination thereof.

Herein, the term "active entity" is understood to include chemical, biological or pharmaceutical entities including any natural or synthetic chemical or biological substance that influences a cell with which the entity is in contact. Typical active entities include but are not limited to active pharmaceutical ingredients, antibodies, antigens, biological materials, chemical materials, chromatogenic compounds, drugs, enzymes, fluorescent probes, immunogenes, indicators, ligands, nucleic acids, nutrients, peptides, physiological media, proteins, receptors, selective toxins and toxins.

Herein, by "indicator" is meant any active entity that upon interaction with some stimulus produces an observable effect. In the context of the present invention, by stimulus is meant, for example, a specific second active entity (such as a molecule) released by a cell and by observable effect is meant, for example, a visible effect, for example a change in color or emission of light.

Herein, by "picowell array" is meant a group of one or more picowells, preferably a plurality of picowells, preferably a plurality of picowells arranged in an orderly fashion.

Some embodiments of the present invention include components that are transparent or are made of a transparent material. By "transparent" is meant that the component or material is substantially transparent to at least one wavelength of light (preferably a range of wavelengths) in at least part of the visible light spectrum, the ultraviolet light spectrum and/or or of infrared radiation, preferably the visible light spectrum.

It is important to note that some embodiments of the present invention are related to embodiments of unpublished copending PCT Patent Application No. IL04/00571 of the Applicant filed 27 Jun. 2004. In PCT Patent Application No. IL04/00571 are taught picowell-bearing carriers having a variety of innovative features. One aspect of the teachings of PCT Patent Application No. IL04/00571 is of picowells configured to influence cell proliferation of cells held therein. In one embodiment, carriers having picowells of a changeable size is taught. In another embodiment, carriers configured to delay proliferation of cells held therein, for example by delaying or preventing cell adhesion, are taught. In another embodiment, carriers configured so as to allow cells to grow into or through the carrier are taught. The above-described embodiments are preferably implemented by making the picowells of or coating the picowells with a material with the desired properties. In some embodiments, the inner surface of a picowell with which a held cell makes contact is configured to have the desired property, influence or effect. Preferred materials from which to make carriers listed in PCT Patent Application No. IL04/00571 include polydimethylsiloxane, elastomers (such as silicon rubber), polymerized para-xylylene molecules, polymerized derivatives of para-xylylene molecules and gels (especially hydrogels). In some embodiments, the inner surface of a picowell with which a held cell makes contact is configured to have the desired property, influence or effect.

An additional aspect of PCT Patent Application No. IL04/00571 is the teaching of a gel cover for picowell-bearing components. The gel cover is configured to prevent cells held in a picowell from exiting the picowell due to jostling, incidental fluid flows or during movement of the carrier.

The advantages of a picowell-bearing carrier made of a gel, of a picowell gel-cover or a gel carrier covered with a gel cover include, depending on the embodiment, that active entities may be integrated into the gel, that active entities may be contacted with the cell by diffusion through the gel, that diffusion of released compounds is slowed down allowing identification of which cell released a given compound, that proliferation of cells held therein is delayed but once cells begin to proliferate, that allows proliferation into and through the gel matrix.

Picowell-Bearing Device of the Present Invention

Figure 1:
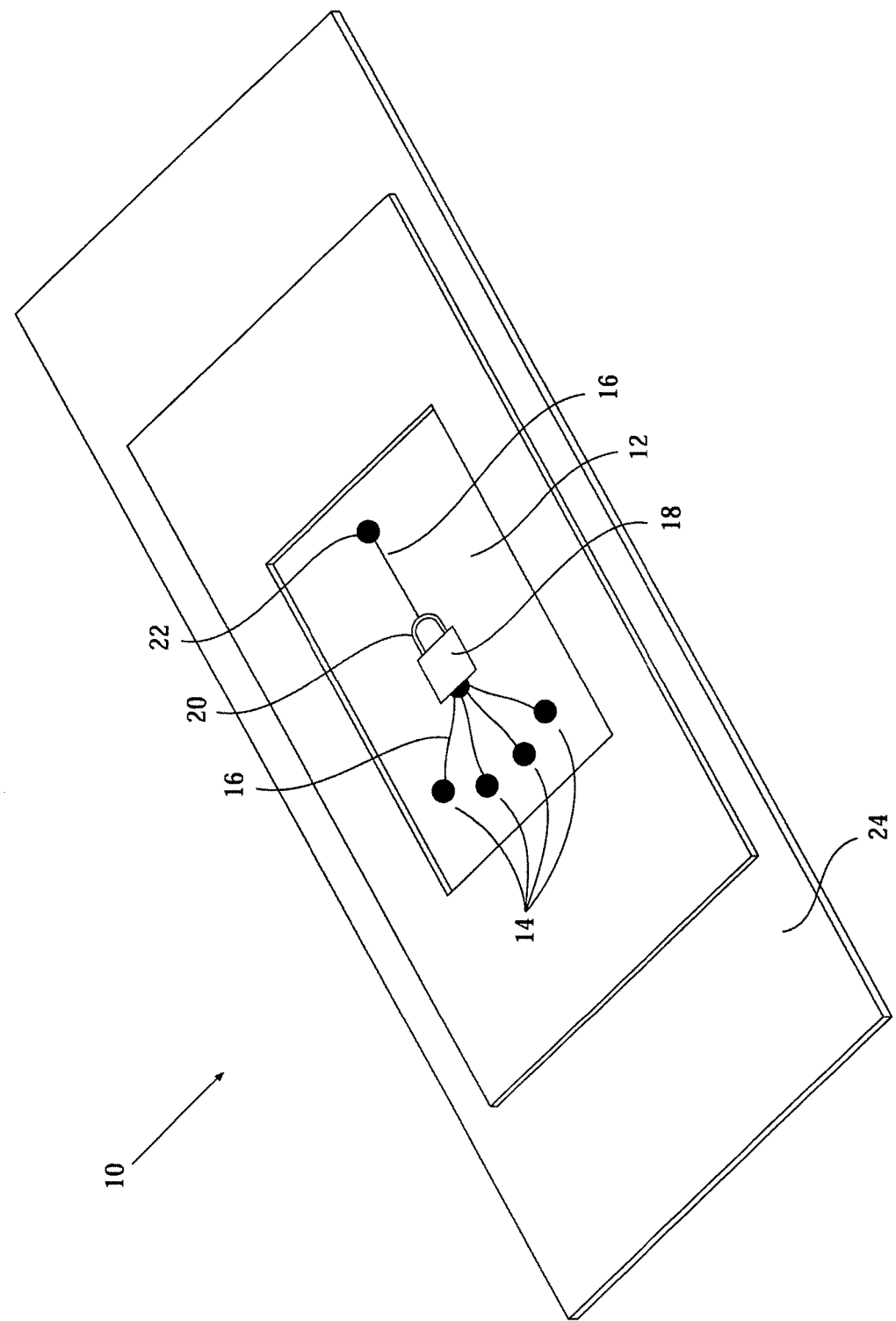
Figure 2:
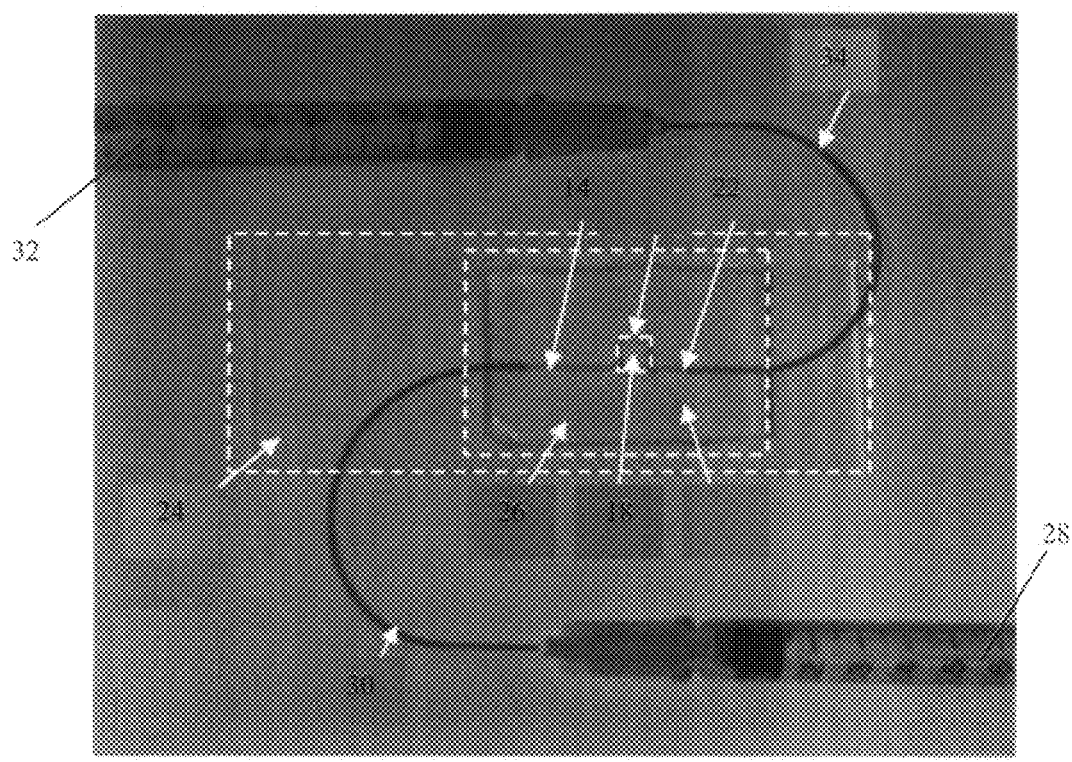
Figure 3:
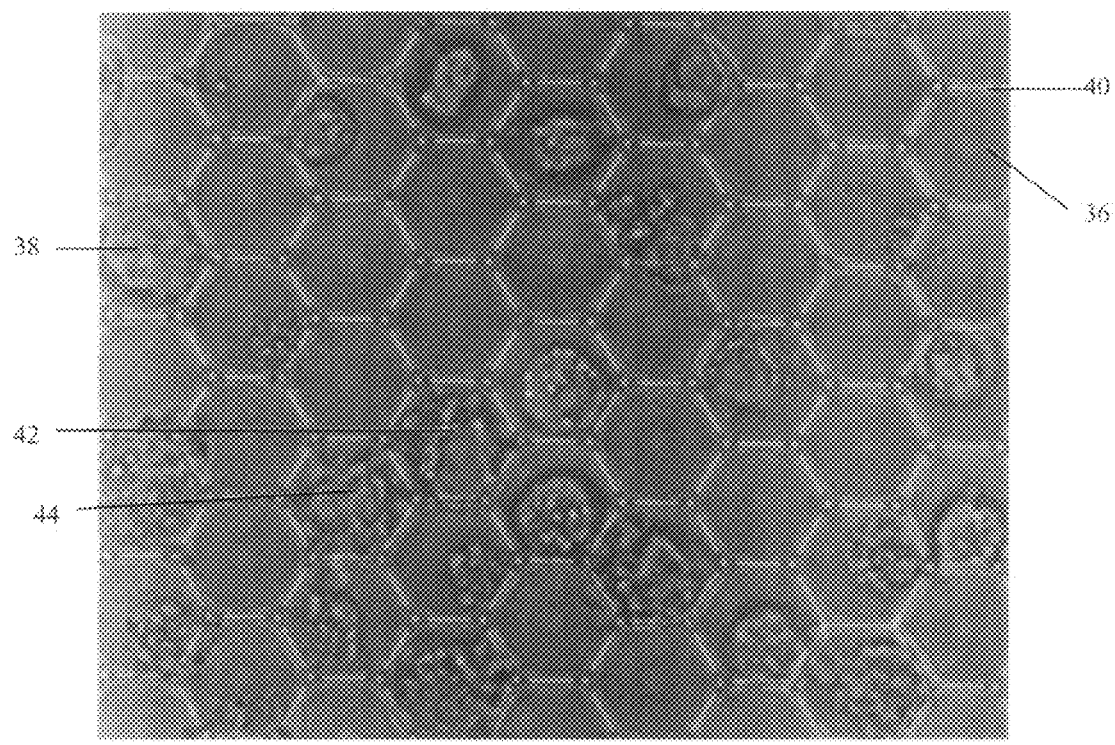
Figure 4A:
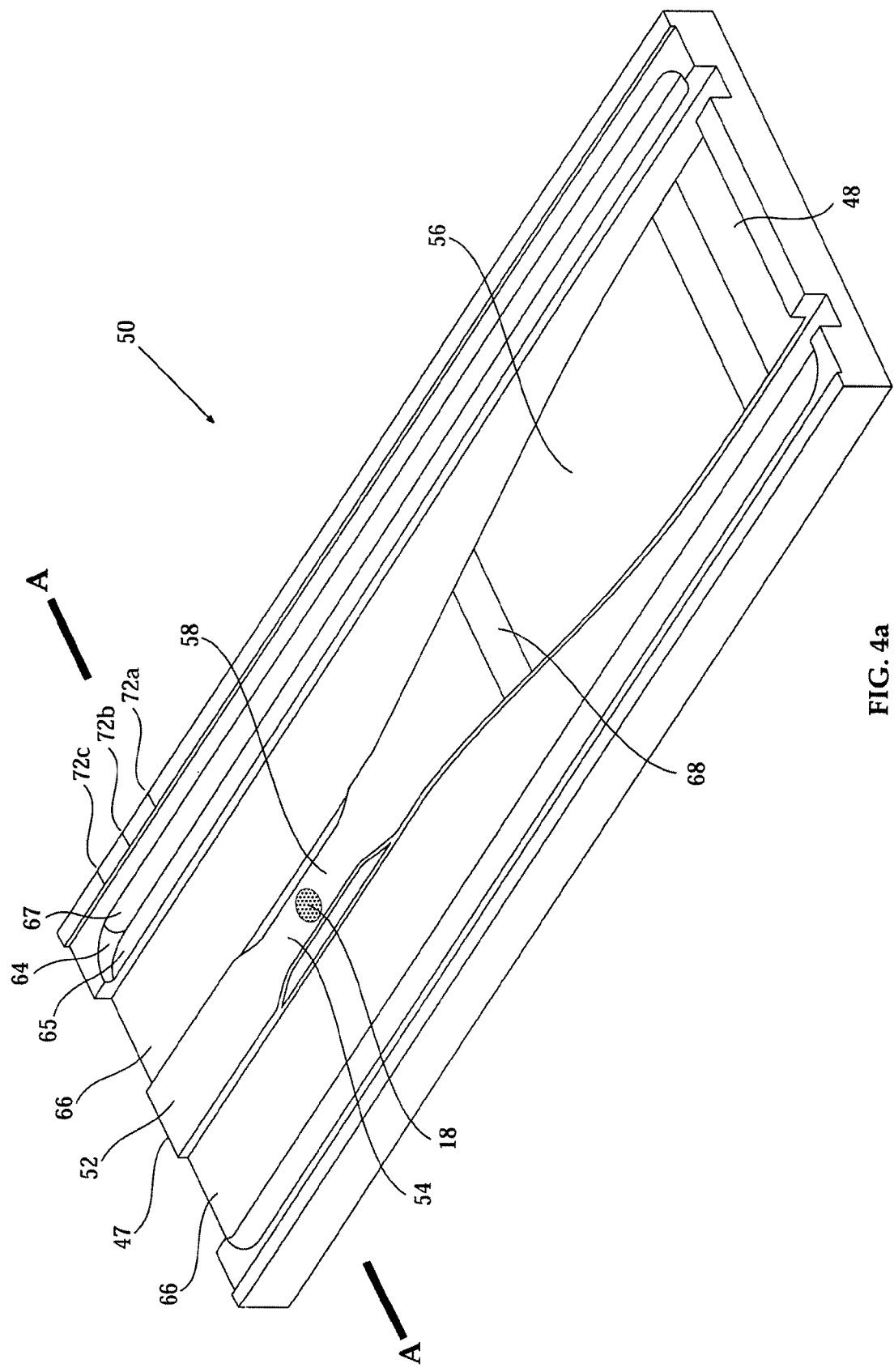

A picowell-bearing device 46 of the present invention, consisting essentially of three components: carrier 50, lid 60 and lid holder 61 is depicted, inter alia, in FIG. 4A (without lid 60 and lid holder 61), 4B (lid holder 61 not depicted) and 4C. A picowell-array 18 is found in a depression found on plateau 47 on upper surface 48 of carrier 50, FIGS. 4A and 4C. Flanking plateau 47 are gaps 66. At each of the two sides of carrier 50 are rails 64, each rail including a rail ledge 65 and a rail wall 67.

Figure 4B:
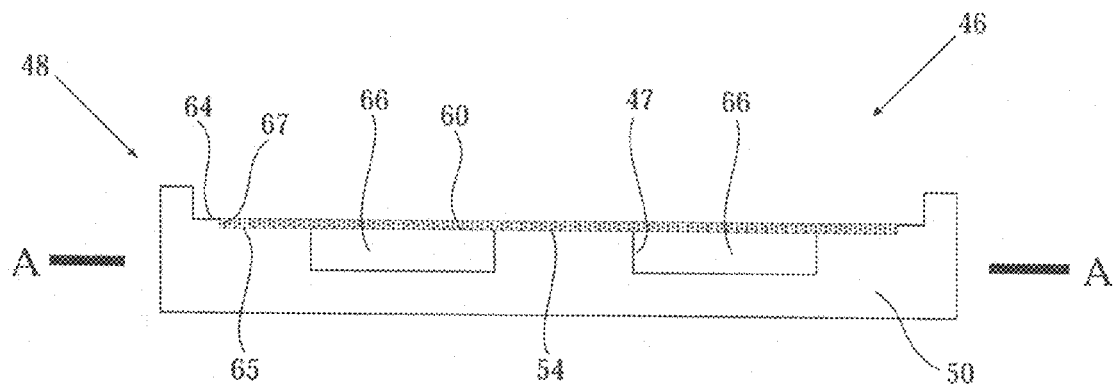
Figure 4C:
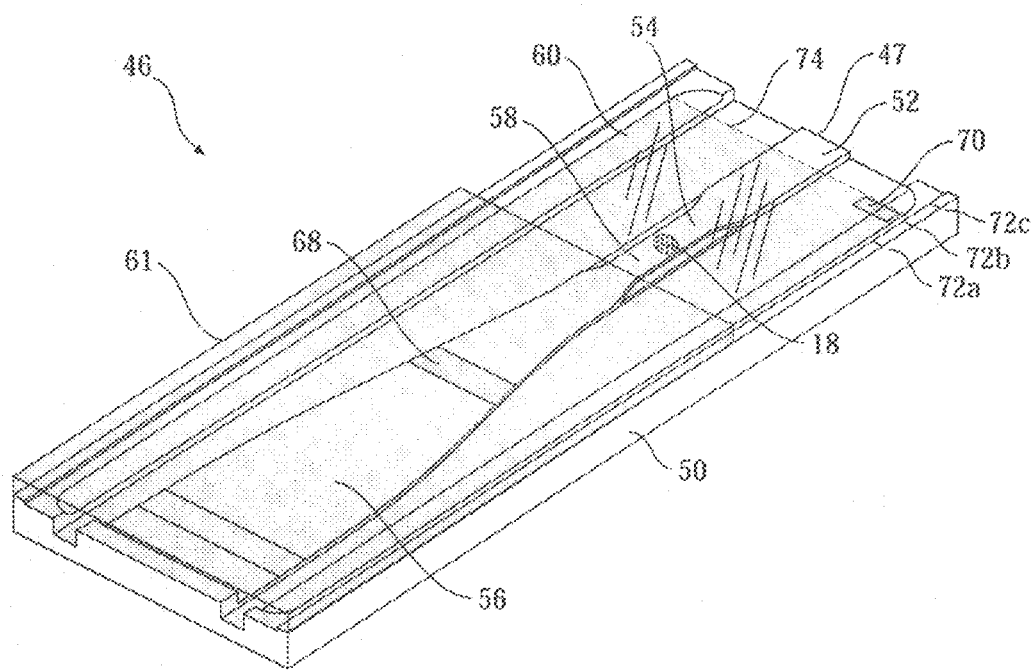

As depicted in FIGS. 4B and 4C, lid 60 is configured to fit carrier 50 substantially parallel to upper surface 48, substantially resting on plateau 47 and rail ledges 65. Lid holder 61 is configured to fit over lid 60 and to engage carrier 50 (e.g., by "snapping into place") so as to secure lid 60 to carrier 50 and to allow device 46 to be held without touching or contaminating any sensitive or delicate parts. When in place, lid 60 is laterally confined by rail walls 67, vertically confined by lid holder 61 but is axially slidable in parallel to upper surface 48. Further, the interface between the top of plateau 47 and lid 60 defines a space of capillary thickness flanked by gaps 66, the space of capillary thickness constituting fluid reservoir 52 and capillary channel 54 upstream of picowell array 18 and waste capillary channel 58 and waste reservoir 56 downstream of picowell array 18. When lid 60 is in place substantially in parallel with upper surface 48, a drop of fluid placed in contact with end 74 of lid 60 on plateau 47 (constituting a part of fluid reservoir 52) is drawn by capillary action into and past fluid reservoir 52, through capillary channel 54 over and past picowell-array 18, through waste capillary channel 58 and out to waste reservoir 56, see FIG. 4C.

In carrier 50, the border between waste capillary channel 58 and waste reservoir 56 is not clearly delineated: waste capillary channel 58 is the downstream region of plateau 47 proximate to picowell array 18 while waste reservoir 56 is substantially a broader and longer section of plateau 47 downstream from waste capillary channel 58.

In carrier 50, the border between fluid reservoir 52 and capillary channel 54 is not clearly delineated: capillary channel 54 is the region of plateau 47 proximate to picowell array 18 and upstream thereof while fluid reservoir 52 is substantially a region of plateau 47 upstream from capillary channel 54. It can even be said that fluid reservoir 52 is substantially the region of plateau 47 that is in proximity to the end 74 of lid 60 when lid 60 is in place substantially in parallel with upper surface 48 as depicted in FIG. 4C.

In device 46, picowell-array 18 is in fluid communication with fluid reservoir 52 through capillary channel 54. Picowell array 18 is in fluid communication with waste reservoir 56 through waste capillary channel 58.

In a picowell-bearing device 46 including a carrier 50, the area of plateau 47 that constitutes a part of waste reservoir 56 and waste capillary channel 58 is relatively large compared to the area of plateau 47 that constitutes a part of fluid reservoir 52 and capillary channel 54. Thus when lid 60 is in place, the volume of waste reservoir 56 and waste capillary channel 58 is significantly larger than the volume of fluid reservoir 52 and capillary channel 54. Fluid placed in fluid reservoir 52 is therefore efficiently drawn from fluid reservoir 52 through capillary channel 54 past picowell array 18 to waste reservoir 56. When waste reservoir 56 is filled to capacity, capillary flow past picowell array 18 effectively ceases. Thus, in FIGS. 4A and 4C, picowell-bearing device 46 is depicted having an absorbent element 68 in fluid communication with waste reservoir 56. Fluid that passes to waste capillary channel 58 is drawn into absorbent element 68, a piece of absorbent filter paper. Absorbent element 68 effectively increases the volume of waste reservoir 56.

In picowell-bearing device 46, waste capillary channel 58 is a single capillary channel that is substantially defined by the interface of lid 60 and plateau 47. Therefore, lid 60 is a component of waste capillary channel 58. In embodiments of the present invention, there is more than one waste capillary channel 58. In embodiments of the present invention (not depicted), one or more waste capillary channels 58 are channels inside carrier 50 and are not defined in part by a lid 60.

In picowell-bearing device 46, capillary channel 54 is a single capillary channel that is substantially defined by the interface of lid 60 and plateau 47. Therefore, lid 60 is a component of capillary channel 54. In embodiments of the present invention, there is more than one capillary channel 54. In embodiments of the present invention (not depicted), one or more capillary channels 54 are channels inside a carrier 50 and are not defined in part by a lid 60.

An advantage of the fact that lid 60 is a component of capillary channel 54 in picowell-bearing device 46 is that the position of lid 60 relative to carrier 50 varies the characteristics of the fluid communication between fluid reservoir 52 and picowell array 18. Specifically, the position of lid 60 determines the length (and consequently volume) of capillary channel 54 and thus influences the rate of flow from fluid reservoir 52 and to picowell array 18.

It is important to note that in picowell-bearing device 46 of the present invention the region of plateau 47 that constitutes a part of fluid reservoir 52 is simply a wider continuum of the region of plateau 47 that constitutes a part of capillary channel 54. In embodiments of the present invention (not depicted) fluid reservoir 52 is substantially a part of capillary channel 54. It is also important to note that in picowell-bearing device 46 of the present invention the region of plateau 47 that constitutes a part of waste reservoir 56 is simply a wider continuum of the region of plateau 47 that constitutes a part of waste capillary channel 58. In embodiments of the present invention waste reservoir 56 is substantially a part of waste capillary channel 58.

It is advantageous to have access to a picowell array of a respective picowell-bearing device of the present invention to allow loading of cells by sedimentation (discussed hereinbelow and in PCT Patent Application No. IL01/00992 of the inventor) yet at the same time a feature of embodiments of a device of the present invention is that fluid is transported to and from the picowell array by capillary action. It is therefore advantageous that a lid be moveable or removable to allow access to the picowell array of a respective picowell-bearing device of the present invention. Further, as noted hereinabove, in embodiments of the present invention it is useful to change the position of a lid relative to a respective carrier, for example in order to modify the rate of flow from a fluid reservoir of the carrier to the respective picowell array.

Non-depicted embodiments of a device of the present invention include devices having non-moveable lids, that is devices that once the lid is attached to a respective carrier, the lid does not move relative to the carrier, although in some embodiments the lid can be removed and reattached. In such embodiments, a respective lid is physically separated from a respective carrier, for example exposing a respective picowell array. After cells are loaded into the picowell array (as detailed hereinbelow), the respective lid is put in place (for example, snapped into place). In such embodiments, a lid has one or more rest positions, e.g., for regulating the flow rate of fluids from a respective fluid reservoir, but once attached the rest position of the lid is fixed. Currently, such embodiments are less preferred as the attachment of a lid to a physically separated lid to a respective carrier is relatively time-consuming, labor intensive and less suitable for automatization.

It is generally preferable that lid 60 have at least two substantially different rest positions relative to picowell array 18. By "substantially different rest position" is meant, for example, that there is a substantial difference in configuration or performance of the device depending on a rest position chosen. Exemplary rest positions of lid 60 include: a rest position allowing access to picowell array 18 for loading cells into picowell array 18; a rest position allowing addition of fluids to fluid reservoir 52, a rest position where fluid reservoir 52, capillary channel 54 and picowell array 18 are sealed or substantially sealed from the environment to reduce evaporation of fluids; and one or more rest positions allowing flow of fluids from fluid reservoir 52 to picowell array at different rates. In a preferred embodiment of the present invention such rest positions are predetermined.

In an embodiment of a device 46 of the present invention, such as the embodiment depicted in FIGS. 4A, 4B and 4C, 60 is moveable relative to carrier 50, allowing access to features of carrier 50 such as picowell array 18 and also allowing changing the configuration of device 46, for example to vary the rate of fluid flow from fluid reservoir 52 to picowell array 18. Preferably, lid 60 is moveable substantially in parallel, e.g., slidably to upper surface 48. An additional advantage of such sliding association of lid 60 with carrier 50 is simplicity of manufacture.

Preferably, a picowell-bearing device of the present invention is provided with an indicator or indicators to indicate when a respective lid is found at a given predetermined rest position. Such an indicator includes, for example, markings on a carrier 50 and/or on a lid 60. In FIGS. 4A and 4C, markings 72a, 72b and 72c on carrier 50 indicate three substantially different rest positions of lid 60. For use, lid 60 is slid along rails 64 so that end 74 of lid 60 is flush with any one of markings 72a, 72b or 72c. The three rest positions indicated by markings 72a, 72b or 72c are rest positions where fluid reservoir 52 is accessible to allow addition of fluids thereto, the difference between the three rest positions being the length of capillary channel 54: end 74 is flush with marking 72a is shorter than when end 74 is flush with marking 72b is shorter than when end 74 is flush with marking 72c. Picowell-bearing device 46 depicted in FIGS. 4A and 4C is not provided with markings indicating a rest position of lid 60 where picowell array 18 is exposed.

In a preferred embodiment of a device 46 of the present invention, lid 60 is provided with a feature 70 (e.g., a notch, a depression, a protuberance, a slot, a loop, a recess, a handle, an indentation) configured to engage a force-applying device that is used to move lid 60 relative to carrier 50. It is seen in FIG. 4C that feature 70 is a slot-like depression on the upper surface of lid 60.

In an embodiment of the present invention, lid 60 is transparent. In an embodiment of the present invention, carrier 50 is transparent. In a preferred embodiment of the present invention, both lid 60 and carrier 50 are transparent.

In a preferred embodiment, lid 60 is made of polycarbonate or glass. In a preferred embodiment, carrier 50 is a unitary structure of polycarbonate or glass. In a preferred embodiment, lid 60 is glass and carrier 50 is a unitary structure of polycarbonate.

Use of a Picowell-Bearing Device of the Present Invention

Figure 5:
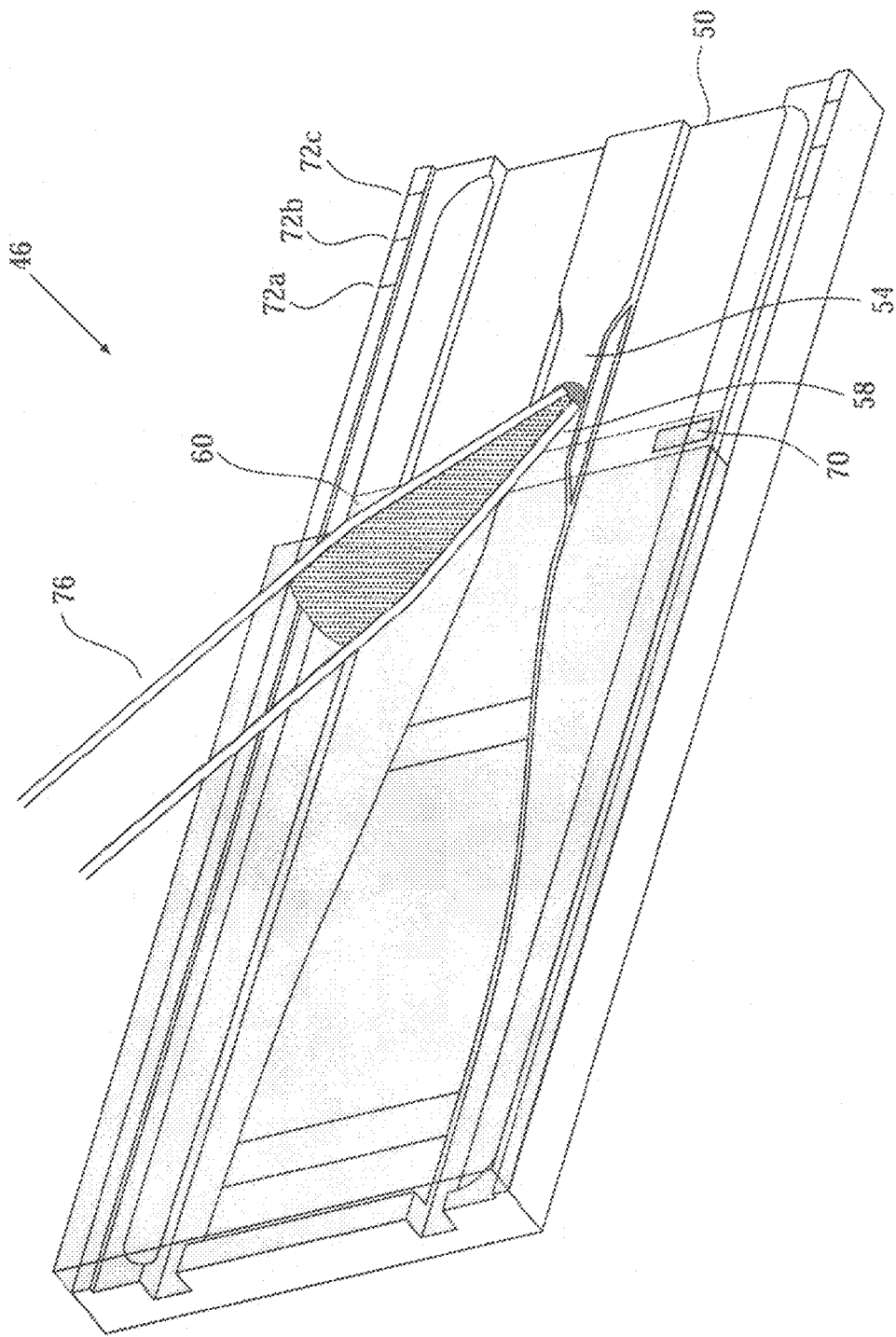

For use, a picowell-bearing device 46 is provided where lid 60 is in a position where picowell array 18 is exposed. A solution of living cells (e.g., K562 Human Erythroid, MOLT-4, Human T Lymphoblasts, Peripheral Blood Lymphocytes (PBL, primary cells), Jurkat T Cell Line, Promonocyte U937) is loaded into picowell array 18, for example using a pipette 76, as depicted in FIG. 5.

Figure 6:
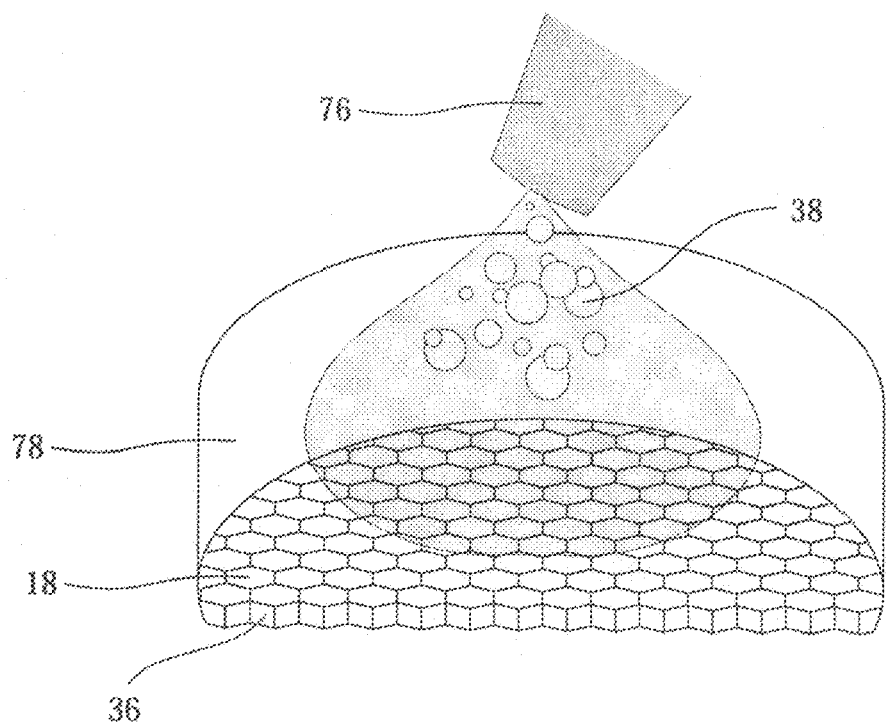
Figure 7:
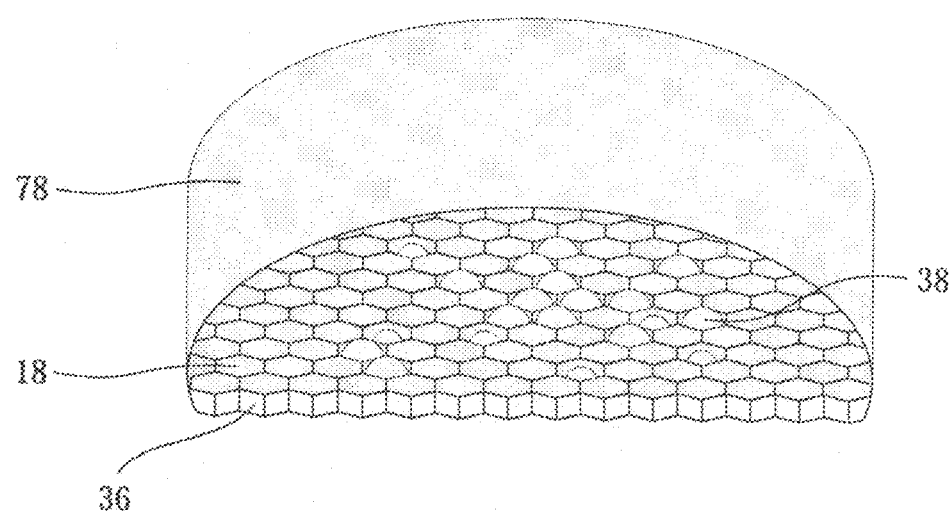

Depression 78 on upper surface 48 of carrier 50 is seen in detail in cross-section in FIG. 6. Picowell-array 18 is found at the bottom of depression 78, picowell-array 18 made up of a hexagonal array of tightly packed knife-edged picowells 36. Cells 38 from the solution applied from pipette 76 settle by gravitation, each cell into an individual hexagonal picowell 36, in cross-section in FIG. 7.

Figure 8:
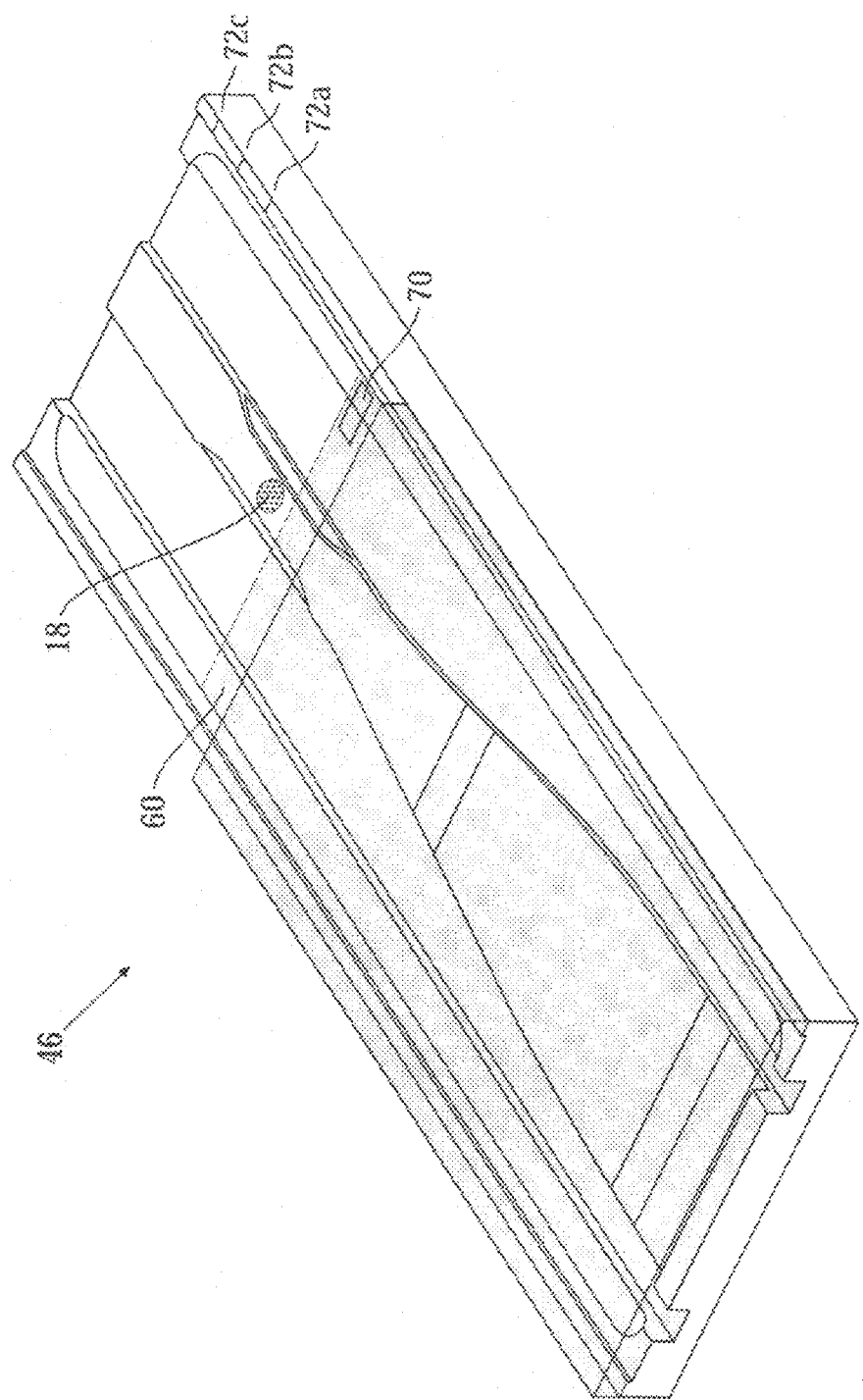
Figure 9:
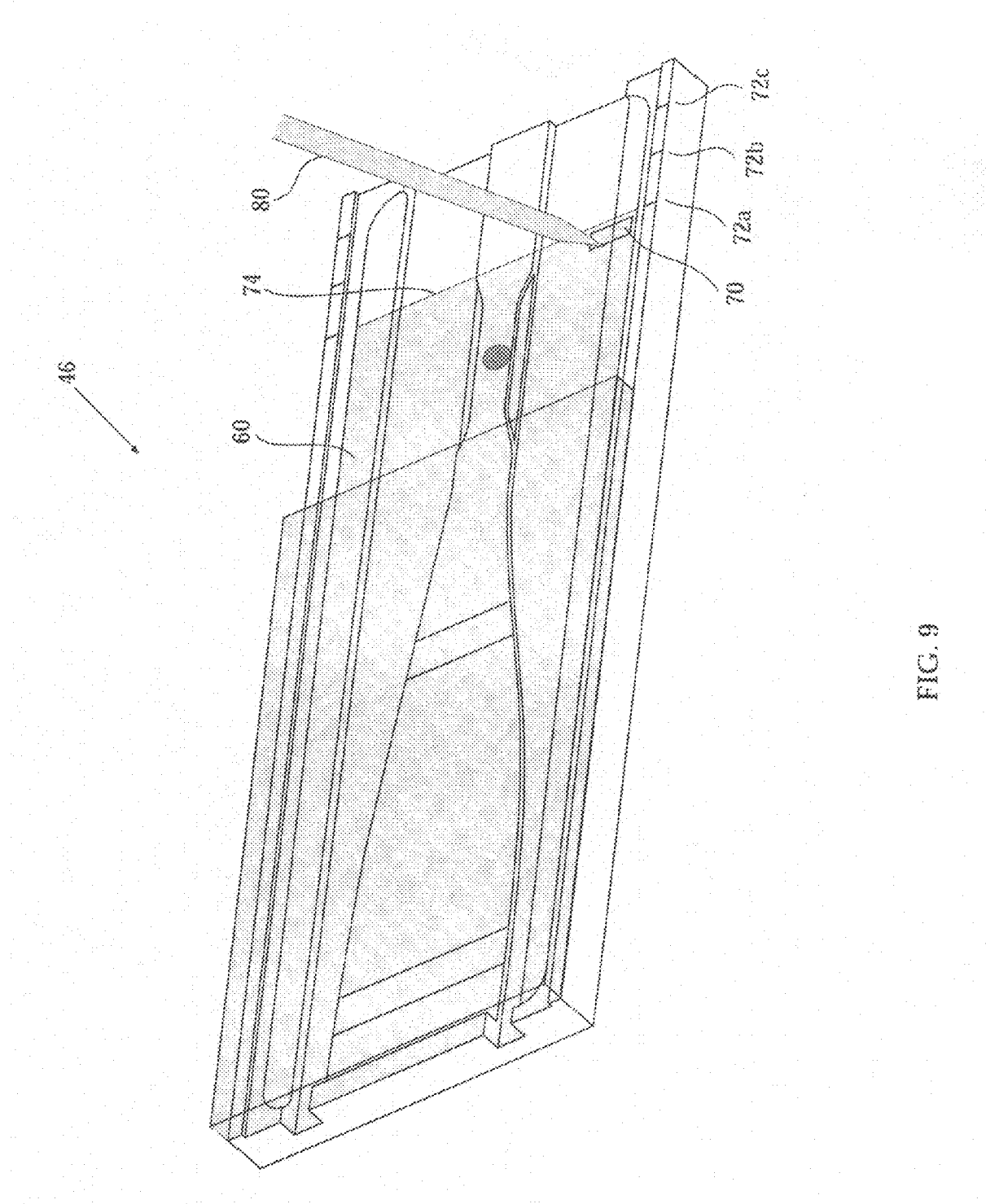

Subsequently to the loading of the cells, from a position where picowell array 18 is exposed to the environment as depicted in FIG. 8, a force-applying device 80 (a stylus) engages slot-like feature 70 on the upper surface of lid 60, FIG. 9. Force applying device 80 is used to slide lid 60 past the rest position indicated by marking 72a to the rest position where end 74 of lid 60 is flush with marking 72b, FIG. 10.

Figure 10:
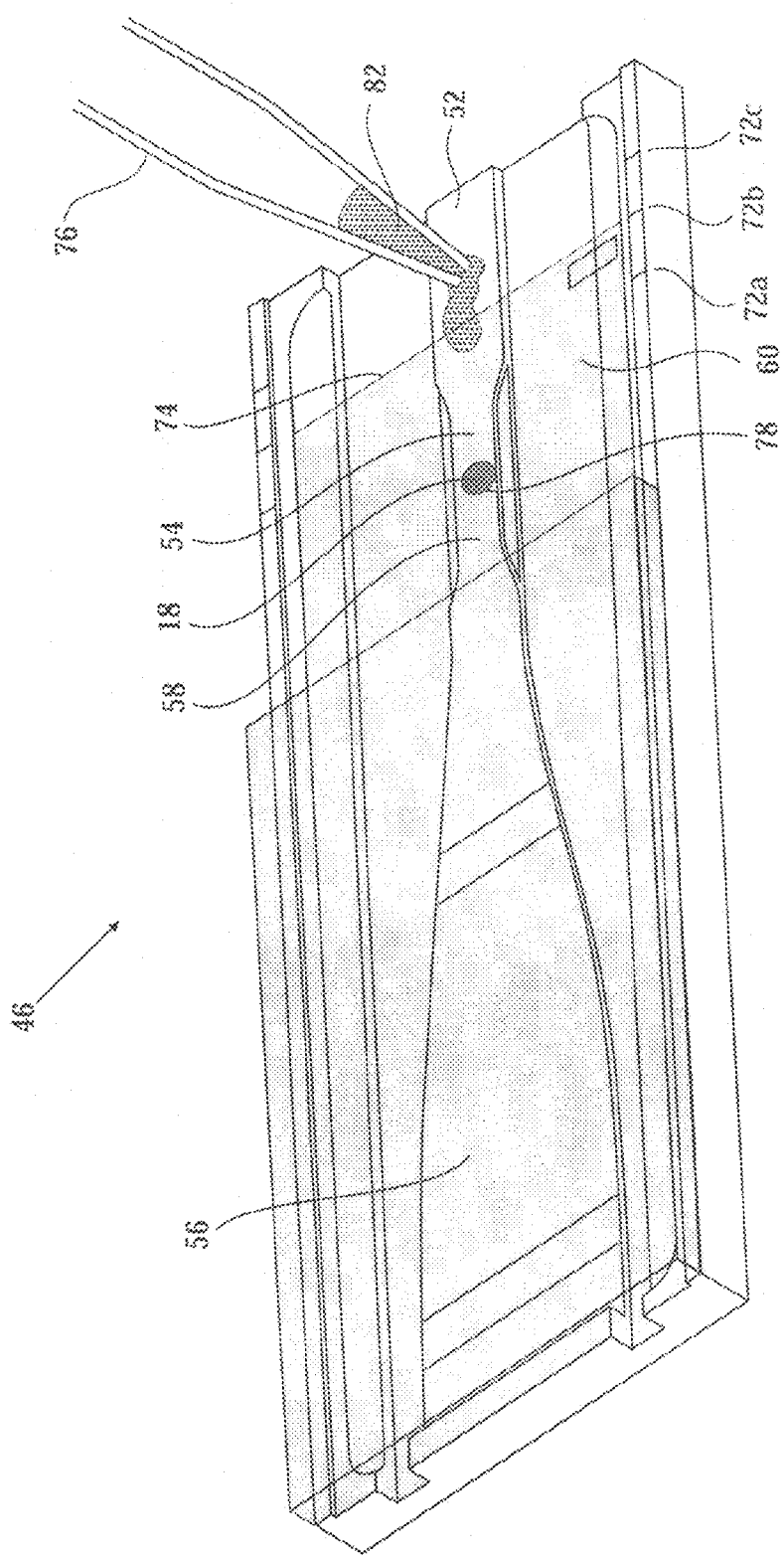

Subsequently, as depicted in FIG. 10 a pipette 76 is used to add a cell washing solution 82 (e.g., PBS, DMEM or RPMI) to fluid reservoir 52. From fluid reservoir 52, cell washing fluid 82 is transported by capillary action through capillary channel 54, past picowell array 18 inside depression 78 and out through waste capillary channel 58 to waste reservoir 56, thus washing living cells 38 held in picowells 36.

Figure 11:
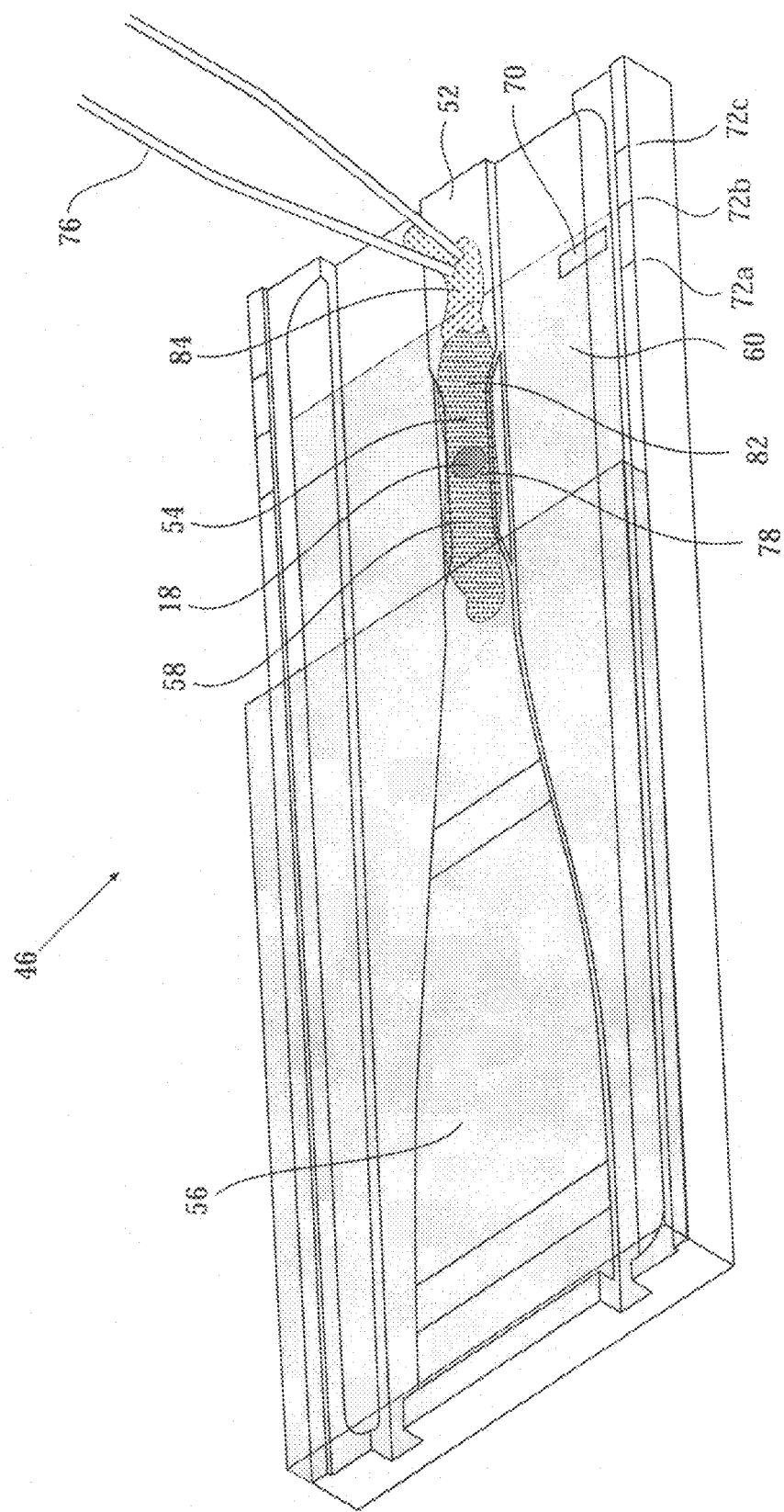

Subsequently, as depicted in FIGS. 11 and 12 a pipette 76 is used to add a cell staining solution 84 (e.g., fluorescein diacetate (1 micromolar), acridine orange (5 micromolar), rhodamine 123 (1 micromolar), FDA, PI, Annexin V, anti-GlycophorinA antibody labeled with allophycocanin for the study of GFP expression) to fluid reservoir 52. From fluid reservoir 52, cell staining fluid 84 is transported by capillary action through capillary channel 54, past picowell array 18 inside depression 78 and out through waste capillary channel 58 to waste reservoir 56, thus staining living cells 38 held in picowells 36. During transport of the fluids, cell-staining solution 84 displaces cell-washing solution 82, as depicted in FIG. 11 and in FIG. 12.

Subsequently to the addition of cell staining fluid 84, a force applying device 80 (a stylus) engages slot-like feature 70 on the upper surface of lid 60 and is used to slide lid 60 from the rest position where end 74 of lid 60 is flush with marking 72b, as depicted in FIG. 13, to the rest position where end 74 of lid 60 is flush with marking 72c, as depicted in FIG. 14. In the rest position where end 74 of lid 60 is flush with marking 72c (e.g., FIG. 14), fluid reservoir 52, capillary channel 54, picowell array 18 and waste capillary channel 58 are substantially sealed so that living cells 38 held in picowells 36 of picowell array 18 are held in a stable environment.

When sufficient time has passed for cell staining, living cells 38 held in picowells 36 of picowell array 18 of picowell-bearing device 46 are examined using observation device 86, in FIG. 15 an Olympus BX61 motorized research microscope (Olympus America Inc., Melville, N.Y., USA).

As depicted in FIG. 15, in embodiments of the present invention living cells 38 held in picowells 36 of picowell array 18 are examined from above. In embodiments of the present invention (not depicted), cells 38 are observed from below by an observation device positioned below picowell-bearing device 46. In such embodiments, carrier 50 is preferably thinned from below in the vicinity of picowell array 18. In general, the thinner carrier 50 is in the vicinity of picowell array 18, the less influence carrier 50 has on light passing therethrough. In embodiments of the present invention the thinning is such that the bottom of carrier 50 in the vicinity of picowell array 18 is substantially parallel to the bottom surface of picowell array 18. Such an embodiment is depicted in FIG. 23, for a carrier 112.

If desired, picowell-bearing device 46 of the present invention is transferred to an incubator for a period of time, before, during or after living cells 38 are examined using observation device 86.

Described hereinabove is an experiment where cells 38 held in a picowell array 18 of a device 46 of the present invention undergo only two treatment steps: a first washing step with cell washing solution 82 and a second staining step with cell staining solution 84. Using a device of the present invention such as 46, a greater number of steps are performed if desired. In the embodiment of the present invention described hereinabove, the volume of waste reservoir 56 (and, if present, the volume of absorbent element 68 functionally-associated therewith) ultimately determines the maximal number of such steps that can be performed Described hereinabove is an experiment where cells 38 held in a picowell array 18 of a device 46 of the present invention undergo only two types of treatment: washing and staining. In embodiments of the present invention, cells held in picowells of a picowell array of a device of the present invention undergo other types of treatments including washing steps and/or staining steps and/or exposure to solutions containing active entities such as drug candidates, selective toxins, active pharmaceutical ingredients and the like.

In embodiments of the present invention, a carrier of the present invention includes more than one picowell array. For example, depicted in FIG. 16 is a carrier 87 of the present invention with three picowell arrays, 18a, 18b and 18c in depressions along the path of fluid flow defined by capillary channel 54 and waste capillary channel 58. For use, cells are loaded in each one of picowell arrays 18a, 18b and 18c. Preferably, different types of cells are loaded in each one of picowell arrays 18a, 18b and 18c, allowing performance of experiments on more than one type of cell using one carrier 87. In an embodiment of the present invention, in either or both downstream picowell arrays 18b and 18c are loaded indicator cells, that is cells that react to waste, effluent or active entities released from cells held in upstream picowell array 18a.

As depicted in FIGS. 4B and 4C, lid 60 is configured to fit substantially parallel with upper surface 48 of carrier 50, substantially resting on plateau 47 and rail ledges 65. When in place, lid 60 is laterally confined by rail walls 67, vertically confined by lid holder 61 but is axially slidable in parallel to upper surface 48. In embodiments of the present invention such as holder 51 depicted in FIG. 17, lid 60 is configured to slidingly engage grooves 62 in rails 64 so that when in place, lid 60 is laterally and vertically confined by grooves 62 but is axially slidable in parallel to upper surface 48. In such embodiments, a component such as lid holder 61 is not needed as grooves 62 secure lid 60 to carrier 51.

Automatized Study of Cells

Upon perusal of the description and figures herein, one skilled in the art recognizes that a device of the present invention coupled with prior art robotics and control systems allows implementation of the fully automatized study of large groups of cells as individuals. Specifically, the use of capillary fluid transport in communication with a well-defined fluid reservoir obviates the need for the use of external flow generators such as pumps and concomitant connections and adapters. The use of a moveable lid (as opposed to a removable lid that is not moveable) that covers and uncovers the picowell array for use allows for the use of a relatively simple robotic system made of commercially available components. Heretofore, efficient automatization has not been practically possible using prior art picowell-bearing devices.

For automatized use a device 46 of the present invention is placed in an appropriately configured robotic device, such as robotic device 88 depicted in FIG. 18, which characterization, design, and construction of is well within the ability of one skilled in the art. In robotic device 88, device 46 (not to scale in FIG. 18) is placed on a moveable trolley 90 (as a transport component) equipped with a lid-moving device 92. Robotic device 88 is provided with a cell-solution distributing station 94, a cell-wash solution distributing station 96, a cell-staining solution distributing station 98 and an observation device 86. All components of robotic device, including motion of trolley 90 and activation of lid moving device 92 are controlled by control system 100.

The steps of such an automatized use of device 46 are substantially similar to those described above for manual use of device 46. Since the features, dimensions and characteristics of a device 46 are easily standardized, robotic device 88 is easily programmed to open and close a lid 60 (using, for example, lid moving device 92), to deposit a desired amount of solution of living cells into a picowell array 18 (using, for example, cell-solution distributing station 94), to deposit a desired amount of solutions (e.g., a wash solution using cell-wash solution distributing station 96 or a stain solution using cell-staining solution distributing station 98) in a fluid reservoir 52 and to transfer device 46 to observation by an observation device 86.

Characteristics of Picowells of a Device of the Present Invention

Preferably, individual picowells of a picowell array are individually addressable. For ease of optical study and observation, it is preferred that the bottoms of all picowells be substantially coplanar: coplanarity allows for optical observation of many cells (whether by scanning or simultaneously using a wide-angle observation component) without the need for time consuming and technically difficult to implement refocusing.

Preferably, picowells of a picowell array are juxtaposed. By juxtaposed is meant that in an area where picowells are found, most of the area is picowell area and little of the area is inter picowell area. According to a feature of the present invention, by juxtaposed is meant that the inter picowell area between two picowells is less than or equal to 0.35, 0.25, 0.15, 0.10 or even 0.06 of the sum of the areas of the two picowells. In certain embodiments of the present invention it is preferred that the inter picowell area be substantially zero, that is that the rims of picowells are substantially knife-edged.

As the teachings of the present invention are directed to cellular biology, it is generally preferred that the picowells be small so as to avoid having a large number of cells held in any one picowell. Thus, generally, the dimensions of the picowells are generally up to about 200, 100, 50, 25 or even 10 microns. By dimensions is meant the usual meaning of the word and is dependent on the shape of the picowell. For example, for hexagonal or circular picowells, the term dimension refers to diameter. For square or triangular picowells is meant the longest dimension of the square or triangle, respectively. The exact dimensions of individual picowells depends on the type (and consequently size) of cells to be studied and the types of experiments and studies that are to be performed. Since different types of cells have different sizes, generally a picowell array of the present invention has picowells of a size to accommodate one or more cells of the type to be studied. In some embodiments it is preferred that an individual picowell be of a size so as to hold no more than one living cell of a certain size. In other embodiments it is preferred that the picowell be of a size so as to held no more than a predetermined number of cells of a certain size (e.g., two or three cells simultaneously).

In some embodiments of the present invention, picowells are dimples or depressions on the bottom surface of the picowell array. In other embodiments the picowells are substantially enclosures of dimensions so that at least one cell of a certain size is containable, preferably but not necessarily substantially entirely, within the enclosure, each enclosure having an opening at the surface, the opening defined by a first cross section of a size allowing passage of cell of the certain size The exact dimensions of the individual enclosures depends on the type (and consequently size) of cells to be studied and the types of experiments and studies that are to be performed. The volume of such enclosure picowells is typically less than $1\times10^{-11}$ liter (corresponding to the volume of a 200 micron cube), less than $1\times10^{-12}$ liter (corresponding to the volume of a 100 micron cube), less than $1\times10^{-13}$ liter (corresponding to the volume of a 50 micron cube), less than $1\times10^{-14}$ liter (corresponding to the volume of a 25 micron cube) and even less than $1\times10^{-15}$ liter (corresponding to the volume of a 10 micron cube). The area of the first cross section, corresponding to the size of the opening of a respective enclosure is typically less than about 40000 $micron^2$ (corresponding to the area of a 200 micron square), 10000 $micron^2$ (corresponding to the area of a 100 micron square), 2500 $micron^2$ (corresponding to the area of a 50 micron square), 625 $micron^2$ (corresponding to the area of a 25 micron square) or even less than about 100 $micron^2$ (corresponding to the area of a 10 micron square).

One embodiment of a carrier of the present invention has dimensions near those of a standard microscope slide, i.e., 28.4 mm wide by 76.2 mm long. The center of picowell array is 18.1 mm from the fluid reservoir edge of the carrier. The width between the two rail walls is 24.5 mm, between the distal edges of the gaps 19.5 mm, of the plateau in the fluid reservoir region 5 mm and of the plateau at the end of the waste reservoir region 15.2 mm. The thickness of the carrier, from the bottom of the carrier to the top of the plateau is 2.3 mm. The radius of the depression in which the picowell array is found is 1 mm and the volume $5\times10^{-6}$ liter. When a respective lid is in place, the volume trapped under the plateau upstream of the picowell array and constitutes part of the fluid reservoir and the capillary channel is about 15 microliter while the volume trapped under the plateau that is downstream of picowell array and constitutes part of the waste reservoir and the waste capillary channel is about 150 microliter.

Methods of Manufacture of a Device of the Present Invention

In general, manufacture and assembly of a device of the present invention is well within the ability of one skilled in the art upon perusal of the description and figures herein using any suitable method with which one skilled in the art is well acquainted. Suitable methods include methods that employ one or more techniques including but not limited to casting, embossing, etching, free-form manufacture, injection-molding, microetching, micromachining, microplating, molding, spin coating, lithography or photo-lithography.

It is generally preferred that a device of the present invention be as simple to manufacture as possible for example by assembling a device of the present invention from as few components as possible.

In an embodiment of the present invention a device 102, see FIG. 19, consists essentially of four components: a) a carrier 50 with an upper surface having a depression 78 in the upper surface, b) a picowell-bearing component 93 bearing a picowell array configured to fit in depression 78, c) a lid 60 configured to rest above the picowell array when picowell-bearing component 93 is fit in depression 78, and d) a lid holder 61 configured to rest above lid 60 and to engage carrier 50 so as to secure lid 60 to carrier 50.

In an embodiment of the present invention a device 104, see FIG. 20, consists essentially of three components: a) a carrier 50 with an upper surface bearing a picowell array on the upper surface, c) a lid 60 configured to rest above the picowell array, and d) a lid holder 61 configured to rest above lid 60 and to engage carrier 50 so as to secure lid 60 to carrier 50.

In an embodiment of the present invention a device 106, see FIG. 21, consists essentially of three components: a) a carrier 51 with an upper surface having a depression 78 in the upper surface, b) a picowell-bearing component 93 bearing a picowell array configured to fit in depression 78, and c) a lid 60 configured to rest above the picowell array when picowell-bearing component 93 is fit in depression 78.

In an embodiment of the present invention a device 108, see FIG. 22, consists essentially of two components: a) a carrier 51 with an upper surface bearing a picowell array on the upper surface, and c) a lid 60 configured to rest above the picowell array.

In devices 104 and 108, the respective picowell array is integrally formed within a depression 78 on the upper surface of carrier 50, as described above.

Generally, in devices 102 and 106, picowell-bearing component 93 is functionally associated with carrier 50 or 51, e.g., by placing picowell-bearing component 93 in a depression 78 on the upper surface of carrier 50 or 51 or by attaching to carrier 50 or 51, as described above In all four devices 102, 104, 106 and 108, respective lids 60 are slidingly moveable. In devices 102 and 104, lid 60 is laterally confined by rail walls 67, vertically confined by lid holder 61 and is axially slidable in parallel to upper surface 48. In devices 106 and 108, lid 60 is laterally and vertically confined by grooves 62 and is axially slidable in parallel to upper surface 48.

In embodiments of the present invention, an entire device of the present invention and all components thereof are made of one material. In other embodiments, a device of the present invention is made up of a number of different materials. In embodiments of the present invention, individual components, for example a carrier, are made of a number of different materials as a plurality of layers or as a coated structure.

In an embodiment of the present invention, the walls of picowells are integrally formed with the bottom surface of the carrier (e.g., 104 and 108). In embodiments including a separate picowell-bearing component (e.g., 102 and 106) the picowell bearing component is made of any suitable material, the same or different than the material from which the carrier is made. Suitable materials from which to make a lid, a carrier or a picowell-bearing component include but are not limited to ceramics, elastomers, epoxies, glasses, glass-ceramics, metals, plastics, polycarbonates, polydimethylsiloxane, polyethylenterephtalate glycol, polymers, polyurethane, polymethyl methacrylate, polystyrene, polyvinyl chloride, rubber, silicon, silicon oxide and silicon rubber.

Manufacture of a carrier with integrally formed picowells, of a carrier without integrally formed picowells or a picowell-bearing component is clear to one skilled in the art upon perusal of the description herein. A preferred method is analogous to the methods disclosed by the inventor in PCT Patent Application No. IL01/00992, in PCT Patent Application No. IL04/00571 and in PCT Patent Application No. IL04/00661. Such a method includes a) contacting a precursor material with a template including a negative of features of the carrier or picowell-bearing component so as to create the desired features in the precursor material, the features including the picowell array; b) fixing the features in the precursor material so as to fashion an incipient carrier or picowell-bearing component; and c) processing the incipient carrier or picowell-bearing component so as to fashion the carrier or picowell-bearing component of the present invention.

Generally but not necessarily, a lid (e.g., 60) and a lid holder (e.g., 61) is a separate component of a device of the present invention. Manufacture of a lid and a lid holder is clear to one skilled in the art upon perusal of the description herein.

In a preferred embodiment, a carrier of a device of the present invention is a unitary component having a picowell array, a fluid reservoir, a capillary channel, a waste reservoir and a waste capillary channel integrally formed thereon, as depicted in FIGS. 20 and 22.

In a preferred embodiment of the present invention, a carrier has a fluid reservoir, a capillary channel, a waste reservoir, a waste capillary channel and a depression integrally formed thereon but a picowell array is part of a separate picowell-bearing component, as depicted in FIGS. 19 and 21. The advantage of such an embodiment is that many carriers are mass produced while a plurality of different types of picowell-bearing components are produced and installed as needed. Typical differences between different types of picowell-bearing components include number, size, shape and arrangements of component picowells.

In an embodiment of the present invention, a picowell-bearing component and a carrier are separately fashioned and then the picowell-bearing component is fixedly attached to carrier in the appropriate location on carrier. Fixed attachment includes the use of methods employing adhesives, welding or surface treatments such as plasma treatment.

A preferred picowell-bearing component is a planar component on which picowells are found, preferably in the shape of a plug (e.g., 93) that snugly fits in a depression (e.g., 78). An additional preferred picowell-bearing component is a grid-like component which constitutes substantially only the walls of picowells, preferably in the shape of a plug that snugly fits in a depression.

In embodiments of the method of making a carrier of the present invention by placing (and optionally attaching) a pre-formed picowell-bearing component or a grid-like component in a precursor plate, it is often advantageous that a given picowell-bearing component have dimensions similar or substantially identical to that of depression in which the picowell-bearing component is placed. Such dimensions allow exact placement of the picowell-bearing component in the depression.

In a preferred embodiment of the present invention depicted in FIG. 23 in cross section, a hole 110, corresponding to a picowell-holding depression 78 as discussed above, is located on a respective carrier 112 and a picowell-bearing component 93 including a picowell array 18 on a upper surface 114 thereof, where the dimensions of picowell-bearing component 93 are somewhat larger than the dimensions of hole 110. For example, a hole 110 is circular and has a diameter of 2 mm while a respective picowell bearing component 93 is a square having 2.2 mm long side. Picowell-bearing component 93 is attached (as described above) to carrier 112 from below so as to seal hole 110 in such a way so that the edges of upper surface 114 of picowell-bearing component 93 contact the area of carrier 112 immediately adjacent to hole 110, thus defining a picowell array holding depression 78 as described above. An advantage of such an embodiment (as discussed above) is that carrier 112 is very thin under picowell array 18 so that observation of cells 38 held in the picowells is minimally influenced.

In an embodiment of the present invention, a picowell-bearing component is fashioned inside a carrier by contacting an appropriate template with a moldable precursor material when the precursor material is inside a depression. Such an embodiment is discussed in detail hereinbelow.

Components of a device of the present invention such as a carrier with integrally formed picowells, a carrier without integrally formed picowells or a picowell-bearing component of the present invention is preferably made according to the methods of the present invention.

A first method of the present invention for making a component of the present invention is substantially by contacting a precursor material with a template, the template having a negative of some of the features of the component (especially the picowells) thus creating the features in the precursor material. The features are subsequently fixed in the precursor material making an incipient component. After any further required processing of the incipient component (which may be limited to simply separating the template from the incipient component), the device is assembled from the separate components.

Depending on the precursor material, fixing includes, but is not limited to, methods such as heating the precursor material, cooling the precursor material, curing the precursor material, polymerizing the precursor material, cross-linking the precursor material, irradiating the precursor material, illuminating the precursor material, gelling the precursor material, exposing the precursor material to a fixative and waiting a period of time. By fixative is meant an agent that causes the precursor material to change to the fixed state and is used herein as a general term for such materials as fixatives, hardeners, polymerization/crosslinking/curing initiators, catalysts and agents. It is important to note that in some cases a precursor material is produced by mixing two or more components which thereafter change to a fixed state, for example, by simply waiting a period of time.

In one preferred embodiment of the present invention, the precursor material is a irreversibly deformable precursor material. Herein by irreversibly deformable precursor material is meant a material that does not recover a shape after deformation and so there is usually no need for a separate action to fix the features in the precursor material beyond separating the produced component from the template. In such cases, the precursor material does not substantially chemically change subsequent to contact with the template.

Examples of suitable irreversibly deformable precursor materials include waxes, paraffins, plastics, polymers and the like. In such an embodiment, a preferred template is a stamp, and the contacting of the template with the precursor material is substantially stamping the features of the component into the precursor material, preferably under controlled thermal conditions.

In another preferred embodiment of the present invention, the precursor material is a reversibly deformable precursor material. Herein by reversibly deformable precursor material is meant a material that is capable of recovering shape after deformation and includes gellable fluids, polymerizable materials, powders, fluids and thermoplastic materials.

In a preferred embodiment, the reversibly deformable precursor material is a thermoplastic material at a pliable temperature. Subsequent to the contacting of the template but before the contact is finished, the thermoplastic material is cooled, thus fixing the desired features in the incipient component.

In another preferred embodiment, the reversibly deformable precursor material is a polymerizable material (e.g., a monomer solution, a crosslinkable polymer, a vulcanizable polymers, a polymerizable fluids or a thermosetting resin). Subsequent to the contacting of the template but before the contact is finished, the polymerizable material is polymerized, thus fixing the desired features in the incipient component. In such cases, the precursor material and the material from which the component is made are chemically dissimilar (for example, have the relationship of monomer to polymer).

One preferred polymerizable precursor material is a non-cured polydimethylsiloxane precursor mixture. A mixture of two polydimethylsiloxane components (the prepolymer and curing agent) are mixed together in the desired ratio (preferably about 10:1, but ratios between about 5:1 and about 20:1 are generally suitable) to give a polydimethylsiloxane precursor mixture, the mixture degassed and contacted with the template. The features are fixed by the curing of the mixture. Curing of polydimethylsiloxane precursor generally takes place at room temperature for about 24 hours and, when desired, is accelerated by heating. For example it has been found that components of the device of the present invention made of polydimethylsiloxane are ready for further processing within 2 hours when cured at 60° C. or within 15 minutes when cured at 150° C. A detailed review of methods for the production of micronic features such as picowells from polydimethylsiloxane suitable for implementing the teachings of the present invention are known in the art and discussed, for example, in Ng et al., *Electrophoresis* 2002, 23, 3461-3473 and Duffy et al., *Anal. Chem.* 1998, 70, 4974-4984.

Another preferred polymerizable precursor material is urethane that is polymerized to yield polyurethane.

Another preferred reversibly deformable precursor material is a gellable fluid. After the gellable fluid is brought in contact with the template, the features are fixed by gelling the gellable fluid to yield a gel. Most preferred are gellable fluids that produce a hydrogel.

Gellable fluids known in the art include fluids that gel upon heating, fluids that gel upon cooling, fluids that gel upon irradiation or illumination, fluids that gel as a result of contact with a gelling reagent and fluids that gel after a period of time. Preferred gellable fluids for implementing the teachings of the present invention include solutions of agars, agaroses, gelatins, low melting temperature agaroses, alginates, proteins, protein polysaccharides, $Ca^{2+}$-inducable alginates (especially those that gel at room temperature) and polysaccharides.

One preferred gellable fluid is a low-melting temperature agarose solution. Such a solution is fluid at temperatures that do not harm living cells (e.g., 20° C.) and gel at low temperatures that do not harm living cells (e.g., 4° C.). An exceptionally suitable agarose for implementing the teachings of the present invention that may be purchased, for example, from Cambrex Bio Science Rockland Inc. (Rockland, Me., USA) is HGS-LMP Agarose 0.5% in PBS (Catalogue Nr. 50221).

Another preferred gellable fluid is an alginate solution which gels upon contact with a gelling reagent, the preferred gelling reagent being a solution having a $Ca^{2+}$ ion concentration of greater than about $1 \times 10^{-6}$ M. An exceptionally useful gelling agent is a $20 \times 10^{-3}$ M calcium gluconate solution. Suitable alginate solutions can be purchased from Pronova Biopolymers (Drammen, Norway) and include, for example, Protanal LF120 1% in water and Protanal LF200 1% in water.

The template having a negative of the features is, for example, a stamp or a mold, and is generally made of any suitable material that is more rigid than a respective precursor material. Suitable materials include but are not limited to reversibly deformable materials, irreversibly deformable materials, ceramics, epoxies, glasses, glass-ceramics, metals, plastics, polycarbonates, polydimethylsiloxane, polyethylenterephtalate glycol, polymers, polymethyl methacrylate, paraffins, polystyrene, polyurethanes, polyvinyl chloride, silicon, silicon oxide, silicon rubbers and wax.

The template is made, for example, using methods with which one skilled in the art is acquainted such as casting, embossing, etching, free-form manufacture, injection-molding, microetching, micromachining, microplating, molding, lithography or photo-lithography.

In an embodiment, a device of the present invention is made by making picowells as described above inside a depression (such as 78) of a carrier (such as 50). Suitable carriers include but are not limited to carriers made of reversibly deformable materials, irreversibly deformable materials, ceramics, epoxies, glasses, glass-ceramics, metals, plastics, polycarbonates, polydimethylsiloxane, polyethylenterephtalate glycol, polymers, polymethyl methacrylate, polystyrene, polyurethanes, polyvinyl chloride, silicon, silicon oxide and silicon rubbers. In such a case, a precursor material for making picowells is placed into the depression of the carrier. A template is then placed inside the depression so as to make contact with the precursor material and the precursor material is fixed as described above. Such an embodiment has the advantage that a carrier devoid of picowells of virtually any material is mass produced. Subsequently, a template is made and used for fixing picowells of virtually any desired size, number and arrangement in the carrier.

In another preferred embodiment noted above, a template including the negative of the desired features excepting picowells is contacted with the precursor material so as to form a carrier with a depression devoid of picowells. Subsequently, a grid-like component, constituting substantially the walls of the picowells of the picowell array, is attached using an appropriate method, for example, adhesives (for example, light curable adhesives, such as light curing adhesive 3051 or 3341 manufactured by Henkel Loctite Deutschland GmbH, München, Germany) or surface treatments such as anodic bonding, fusion bonding or plasma treatment such as plasma discharge (exceptionally suitable for attaching polydimethylsiloxane, see Duffy et al., *Anal. Chem.* 1998, 70, 4974-4984).

Another preferred method of making a picowells in a carrier includes photolithography of a photoresist material placed on a substrate, a commercially available process (for example, from Micro Resist Technology GmbH, Berlin, Germany) with which one skilled in the art is well-acquainted. In brief, a template including the negative of the desired features excepting picowells is contacted with the precursor material so as to form a carrier with a depression devoid of picowells. Subsequently, a high aspect ratio photoresist material (e.g., SU-8 thick photoresist fluid, MicroChem Corporation, Newton Mass., USA) is placed in the depression as a uniformly thick film. A preferred method of achieving a uniformly thin film of a photoresist fluid is by spin coating, that is, the photoresist fluid is placed in the depression of the carrier and the carrier rotated about a perpendicular axis. As a result of the rotation the photoresist fluid forms a uniformly thick film, typically between about 5 microns and about 20 microns thick. Once a film of uniform thickness of photoresist material is achieved, the photoresist material is illuminated through a mask, the mask being substantially a template or master of the desired picowells. Developing of the precursor with the selectively fixed film removes the non-fixed areas of the film. In such a way the picowell array is made up of a fixed photoresist layer resting on a carrier where the picowells are carved into the photoresist layer and the bottom of the picowells is the surface of the precursor plate. Using a photolithography method, picowells having a flat-bottom surface are easily produced.

The components of a device of the present invention are made of any suitable material. Suitable materials include but are not limited to ceramics, epoxies, glasses, glass-ceramics, metals, plastics, polycarbonates, polydimethylsiloxane, polymers, polyethylenterephtalate glycol, polymethyl methacrylate, polystyrene, polyurethanes, polyvinyl chloride, silicon and silicon oxide.

Another preferred method of making a device of the present invention comprises attaching one or more picowell-bearing components to a precursor plate using an appropriate method, for example, using an adhesive or a surface treatment such as a plasma treatment, for example as described above. A preferred picowell-bearing component is a carrier comprising a plurality of picowells disposed on a surface. Preferred carriers include those described in PCT Patent Application No. IL 01/00992 or PCT Patent Application No. IL 04/00571.

Some embodiments of the device of the present invention comprise picowells where the inside surface of the picowells (with which held cells potentially make physical contact) is coated with a layer of some desired coating material, for example a coating material that influences the proliferation of living cells as described in PCT Patent Application No. IL04/00571.

One skilled in the art is acquainted with many ways and many coating materials with which to coat an inside surfaces of picowells of a device of the present invention.

One preferred method of coating inside surfaces of picowells of a device of the present invention, applicable to virtually any device produced by virtually any method, comprises contacting a precursor fluid with the inside surface of the picowells and subsequently solidifying the precursor fluid, forming the layer of the coating material. Depending on the nature of the precursor fluid, solidifying is performed by any number of methods including but not limited to heating the precursor fluid, cooling the precursor fluid, polymerizing the precursor fluid, cross-linking the precursor fluid, curing the precursor fluid, irradiating the precursor fluid, illuminating the precursor fluid, gelling the precursor fluid, exposing the precursor fluid to a fixative or waiting a period of time.

One preferred method of coating the inside surfaces of picowells of a device of the present invention, applicable to virtually any device produced by virtually any method, is by vapor deposition. Vapor deposition involves the deposition of materials such as molecules or atoms onto a surface at low pressures and is characterized by the production of evenly thin coatings on a surface, such as the inner surface of a picowell of a device of the present invention.

In one embodiment of vapor deposition to the inside surfaces of picowells of a device of the present invention, the atoms or molecules that make up the coating material are deposited. In another embodiment of vapor deposition, the atoms or molecules that comprise a precursor of the coating material are deposited on the inside surfaces of the picowells, followed by solidifying the coating precursor material thereby forming the layer of coating material. Solidifying of the coating precursor material to form the layer of coating material is performed by any number of methods including but not limited to heating the coating precursor material, cooling the coating precursor material, polymerizing the coating precursor material, cross-linking the coating precursor material, curing the coating precursor material, irradiating the coating precursor material, illuminating the coating precursor material, gelling the coating precursor material, exposing the coating precursor material to a fixative and waiting a period of time.

A preferred coating material for coating the inside surfaces of picowells of a device of the present invention is made of polymerized para-xylylene molecules (or derivatives thereof, specifically where one or more hydrogens, especially aromatic hydrogens of either or both aromatic rings are substituted) deposited by vapor deposition, a coating commercially known as Parylene® (available for example from V&P Scientific, Inc., San Diego, Calif., USA). Parylene® is preferred not only for cell proliferation influencing properties but also for the fact that Parylene® coatings are bacteria resistant, fungus resistant, transparent, have a low permeability, acid and base resistant, uniform, thin (typically 0.1-1 micron) and without voids even when a coated surface includes configurations with sharp edges, points, flat surfaces, crevices or exposed internal surfaces.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination. Although the invention has been described in conjunction with specific embodiments thereof, it is evident that many alternatives, modifications and variations will be apparent to those skilled in the art. Accordingly, the present invention is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In case of conflict, the specification herein, including definitions, will control. Citation or identification of any reference in this application shall not be construed as an admission that such reference is available as prior art to the present invention.

What is claimed is:

1. A picowell-bearing device comprising:
   a) a carrier, having an upper surface;
   b) a picowell array located in a depression on said upper surface;
   c) a fluid reservoir in fluid communication with said picowell array through at least one capillary channel, said capillary channel configured to draw a fluid from said fluid reservoir to said picowell array using capillary action; and d) a capillary waste channel in fluid communication with said picowell array, said capillary waste channel configured to draw a fluid from said picowell array using capillary action.

2. The device of claim 1, further comprising a plateau on said upper surface, wherein at least part of said plateau constitutes at least part of said capillary waste channel.

3. The device of claim 1, further comprising a plateau on said upper surface, wherein said picowell array is located on said plateau, where a first region of said plateau constitutes a part of said capillary channel and a second region of said plateau constitutes a part of said waste capillary channel.

4. The device of claim 1, further comprising a lid resting above said picowell array, said lid configured to move relative to said carrier substantially in parallel to said upper surface.

5. The device of claim 4, wherein varying a position of said lid relative to said carrier when resting above said picowell array determines a length of said capillary channel.

6. The device of claim 4, wherein said lid is non-moveable relative to carrier once said lid is in said rest position where said fluid reservoir, said capillary channel and said picowell array are sealed or substantially sealed.

7. The device of claim 4, wherein said lid is a component of said capillary channel.

8. A picowell-bearing device comprising:
a) a carrier, having an upper surface;
b) a picowell array on said upper surface;
c) a fluid reservoir in fluid communication with said picowell array through at least one capillary channel, said capillary channel configured to draw a fluid from said fluid reservoir to said picowell array using capillary action; and
d) a lid resting above said picowell array, configured to move relative to said carrier substantially in parallel to said upper surface.

9. The device of claim 8, further comprising a capillary waste channel in fluid communication with said picowell array.

10. The device of claim 8, wherein said picowell array is located in a depression on said upper surface.

11. The device of claim 8, further comprising a plateau on said upper surface, wherein at least part of said plateau constitutes at least part of said capillary channel.

12. The device of claim 8, wherein said lid is a component of said capillary channel.

13. The device of claim 8, wherein said fluid reservoir is located on said upper surface.

14. The device of claim 8, wherein said lid is a component of said fluid reservoir.

15. The device of claim 8, wherein varying a position of said lid relative to said carrier when resting above said picowell array determines a rate of flow of said fluid from said fluid reservoir to said picowell array.

16. The device of claim 8, wherein said lid comprises a feature configured to engage a force-applying device used to move said lid relative to said carrier.

17. The device of claim 8, wherein said lid is non-moveable relative to carrier once said lid is in a rest position where said fluid reservoir, said capillary channel and said picowell array are sealed or substantially sealed.

18. A system for the automatized study of cells comprising:
a) a picowell-bearing device comprising a carrier having an upper surface, a picowell array on said upper surface, a fluid reservoir in fluid communication with said picowell array through at least one capillary channel, said capillary channel configured to draw a fluid from said fluid reservoir to said picowell array using capillary action, and a lid resting above said picowell array, wherein said lid is functionally associated with said picowell-bearing device having at least two rest positions, a first rest position where said picowell array is open to the environment and a second rest position where said picowell array is isolated from the environment;
b) a lid-moving component, configured to move said lid to said first rest position and to said second rest position;
c) at least one fluid dispensing component; and
d) a control system functionally associated with said lid-moving component and said at least one fluid dispensing component, said control system configured to operate substantially automatically.

19. The system of claim 18, wherein said lid comprises a feature configured to engage a force-applying device used to move said lid relative to said carrier.

20. A picowell-bearing device comprising:
a) a carrier, having an upper surface comprising a plateau on said upper surface;
b) a picowell array located in a depression on said plateau;
c) a fluid reservoir in fluid communication with said picowell array through at least one capillary channel, said capillary channel configured to draw a fluid from said fluid reservoir to said picowell array using capillary action, and where a first region of said plateau constitutes a part of said capillary channel;
d) a lid resting above said picowell array, configured to move relative to said carrier substantially in parallel to said upper surface and having at least two substantially different rest positions relative to said picowell array, a first rest position where said picowell array is open to the environment and a second rest position where said picowell array is isolated from the environment; and
a capillary waste channel in fluid communication with said picowell array, said capillary waste channel configured to draw fluid from said picowell array using capillary action, and where a second region of said plateau constitutes a part of said waste capillary channel.

21. The device of claim 20, further comprising a waste reservoir in fluid communication with said capillary waste channel.

22. The device of claim 20, wherein said fluid reservoir is located on said upper surface.

23. The device of claim 20, wherein said lid is a component of said capillary channel.

24. The device of claim 20, wherein varying a position of said lid relative to said carrier when resting above said picowell array determines a rate of flow of said fluid from said fluid reservoir to said picowell array.

25. The device of claim 20, wherein said lid comprises a feature configured to engage a force-applying device used to move said lid relative to said carrier.

26. The device of claim 20, said carrier further comprising two rails, wherein said picowell array is located between said two rails, wherein said lid is slidingly associated with said two rails and an area between said two rails substantially defines said capillary channel.

* * * * *